United States Patent
Ruf et al.

(10) Patent No.: US 9,786,059 B2
(45) Date of Patent: Oct. 10, 2017

(54) APPARATUS AND METHOD FOR RESOURCE-ADAPTIVE OBJECT DETECTION AND TRACKING

(71) Applicant: Fraunhofer-Gesellschaft zur Foerderung der angewandten Forschung e.V., Munich (DE)

(72) Inventors: Tobias Ruf, Burgau (DE); Andreas Ernst, Weiden (DE); Jens-Uwe Garbas, Erlangen (DE); Anton Papst, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 79 days.

(21) Appl. No.: 15/008,228

(22) Filed: Jan. 27, 2016

(65) Prior Publication Data
US 2016/0163064 A1 Jun. 9, 2016

Related U.S. Application Data

(63) Continuation of application No. PCT/EP2014/066247, filed on Jul. 29, 2014.

(30) Foreign Application Priority Data

Jul. 30, 2013 (EP) .................... 13178529

(51) Int. Cl.
*G06K 9/00* (2006.01)
*G06T 7/20* (2017.01)
*G06K 9/32* (2006.01)

(52) U.S. Cl.
CPC .......... *G06T 7/20* (2013.01); *G06K 9/32* (2013.01); *G06K 2009/3291* (2013.01); *G06T 2207/20016* (2013.01); *G06T 2207/30201* (2013.01)

(58) Field of Classification Search
CPC ........... G06T 2207/30201; G06T 7/20; G06T 2207/20016; G06T 2207/10016; G06K 2009/3291
See application file for complete search history.

(56) References Cited

U.S. PATENT DOCUMENTS

2005/0129278 A1* 6/2005 Rui .................... G06K 9/00234
382/103
2009/0169067 A1 7/2009 Chang et al.
(Continued)

FOREIGN PATENT DOCUMENTS

DE 102009017772 A1 11/2010

OTHER PUBLICATIONS

Abd-Almageed et al.; "Real-Time Human Detection and Tracking from Mobile Vehicles," Intelligent Transportation Systems Conference, Sep. 1, 2007; pp. 149-154.
(Continued)

*Primary Examiner* — Li Liu
(74) *Attorney, Agent, or Firm* — Haynes and Boone, LLP; Robert Ziemian

(57) ABSTRACT

An apparatus for providing object information based on an image sequence including a plurality of images is provided. The apparatus includes an object detector for conducting object detection on three or more images of the plurality of images of the image sequence to obtain the object information, wherein each image of the image sequence on which object detection is conducted, is an object-detected image of the image sequence, and wherein each image of the image sequence on which object detection is not conducted, is not an object-detected image of the image sequence. Moreover, the apparatus includes an object tracker for conducting object tracking on one or more images of the image sequence to obtain the object information.

14 Claims, 20 Drawing Sheets

(56) References Cited

U.S. PATENT DOCUMENTS

| | | | |
|---|---|---|---|
| 2012/0093368 A1* | 4/2012 | Choi | H04N 5/23219 382/103 |
| 2012/0293486 A1* | 11/2012 | Adachi | G06T 7/20 345/418 |
| 2013/0177203 A1 | 7/2013 | Koo et al. | |
| 2013/0343604 A1* | 12/2013 | Adachi | G06K 9/00711 382/103 |
| 2015/0339757 A1* | 11/2015 | Aarabi | G06Q 30/06 705/12 |

OTHER PUBLICATIONS

Ernst et al.; "A Modular Framework to Detect and Analyze Faces for Audience Measurement Systems," 2nd Workshop on Pervasive Advertising, Luebeck, 2009; pp. 75-87.
Froeba et al.; "Robust Face Detection at Video Frame Rate Based on Edge Orientation Features," IEEE International Conference on Automatic Face and Gesture Recognition, Los Alamitos, CA, US, 2002; pp. 342-347.
Froeba et al.; "Fast Frontal-View Face Detection using a Multi-Path Decision Tree," Audio- and Video-Based Biometric Person Authentication, 2003; pp. 921-928.
Hussein et al.; "Real-Time Human Detection, Tracking, and Verification in Uncontrolled Camera Motion Environments," Fourth IEEE International Conference on Computer Vision Systems, New York, NY, US, Jan. 4-7, 2006; pp. 1-7.
Kueblbeck et al.; "Face detection and tracking in video sequences using the modified census transformation," Image and Vision Computing, 2006; 24(6):564-572.
LaPlante, Phillip A.; "Real-Time Systems Design and Analysis: An Engineer's Handbook," Second Edition, Wiley-IEEE Press; pp. 208-209 (para. 9.1-para. 9.1.2 and Fig. 9.2 ), pp. 218-219 (para. 9.4), and pp. 319-320 (para. 14.4).
Lienhart et al.; "An Extended Set of Haar-like Features for Rapid Object Detection," IEEE ICIP, 2002; vol. 1, pp. 300-903.
Messelodi et al.; "A computer vision system for the detection and classification of vehicles at urban road intersections," Pattern Analysis and Applications, Springer-Verlag, LO, Sep. 1, 2005; 8(1-2)17-31.
Neill et al.; "Specification of real-time imaging systems using the UML," Real-Time Imaging, Academic Press Limited, GB, Apr. 1, 2003; 9(2)125-137.
Rowley et al.; "Neural Network-Based Face Detection," IEEE Transactions on Pattern Analysis and Machine Intelligence, 1998; 20(1):23-38.
Viola et al.; "Rapid Object Detection using a Boosted Cascade of Simple Features," IEEE Conference on Computer Vision and Pattern Recognition, Kauai HI, US, Apr. 2001; vol. 1, pp. 511-518.
Viola et al.; "Robust Real-time Object Detection," International Journal of Computer Vision, 2002; 57(2):137-154.
Wu et al.; "Fast Rotation Invariant Multi-View Face Detection Based on Real Adaboost," Sixth IEEE International Conference on Automatic Face and Gesture Recognition, 2004; pp. 79-84.

* cited by examiner

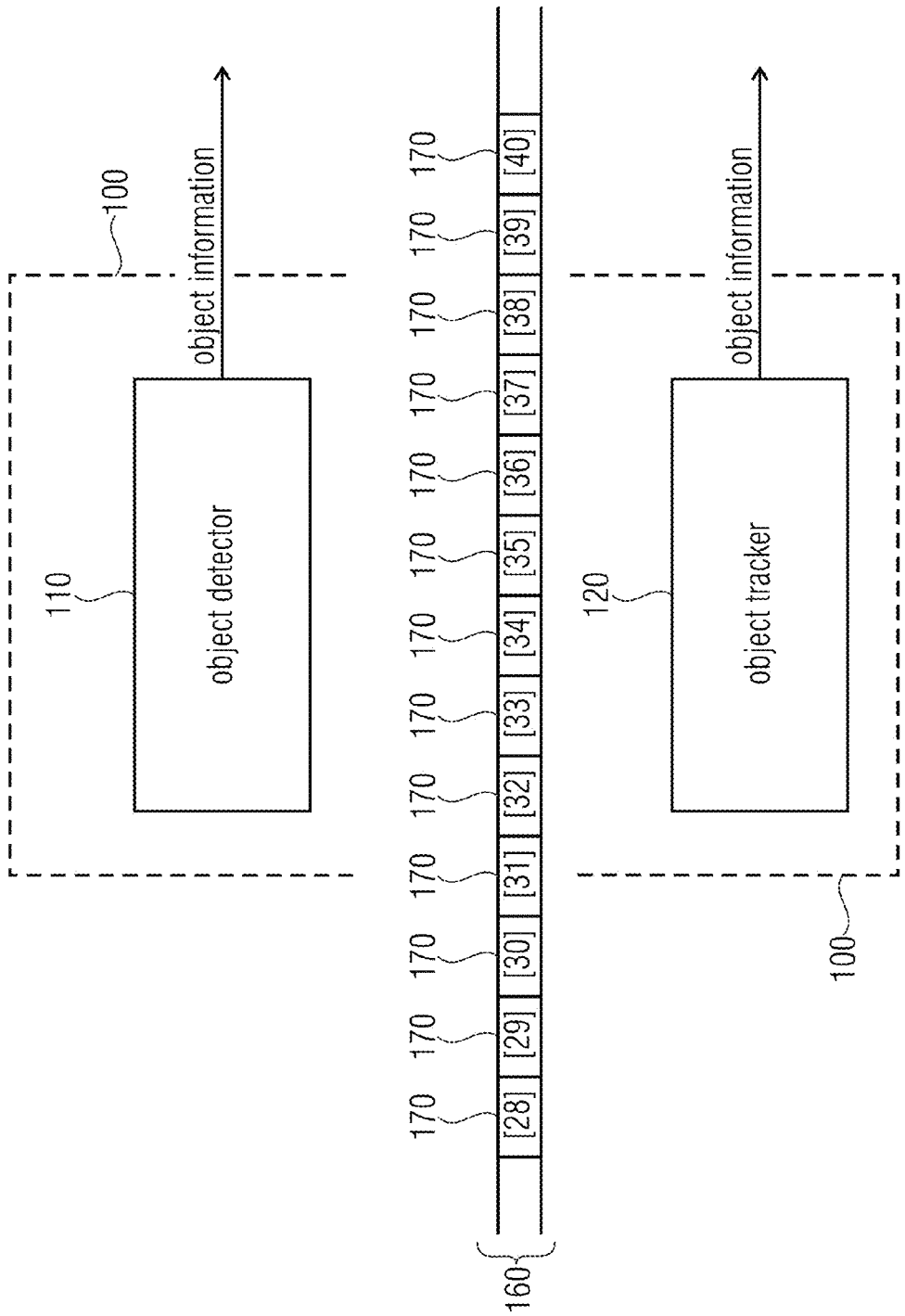

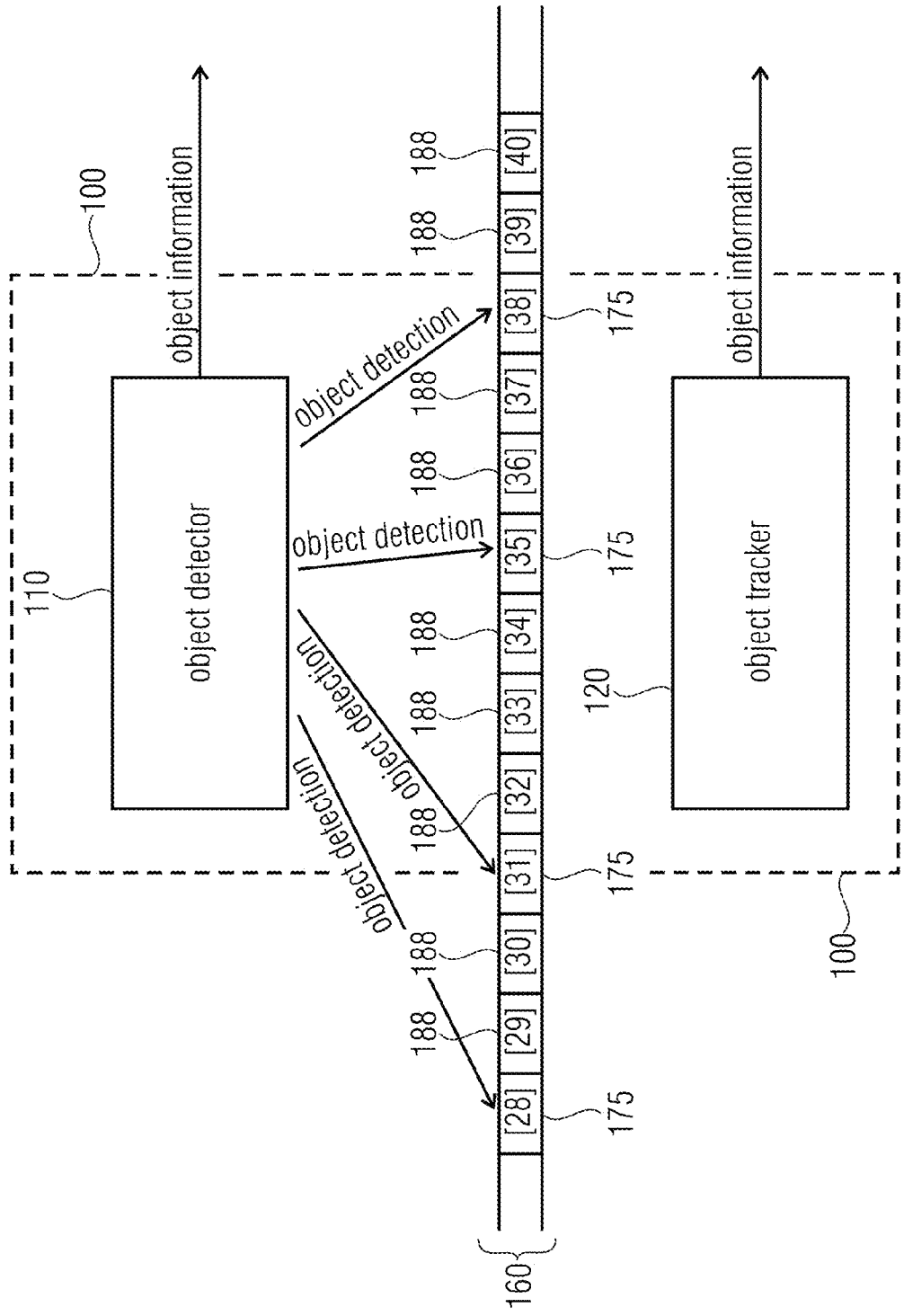

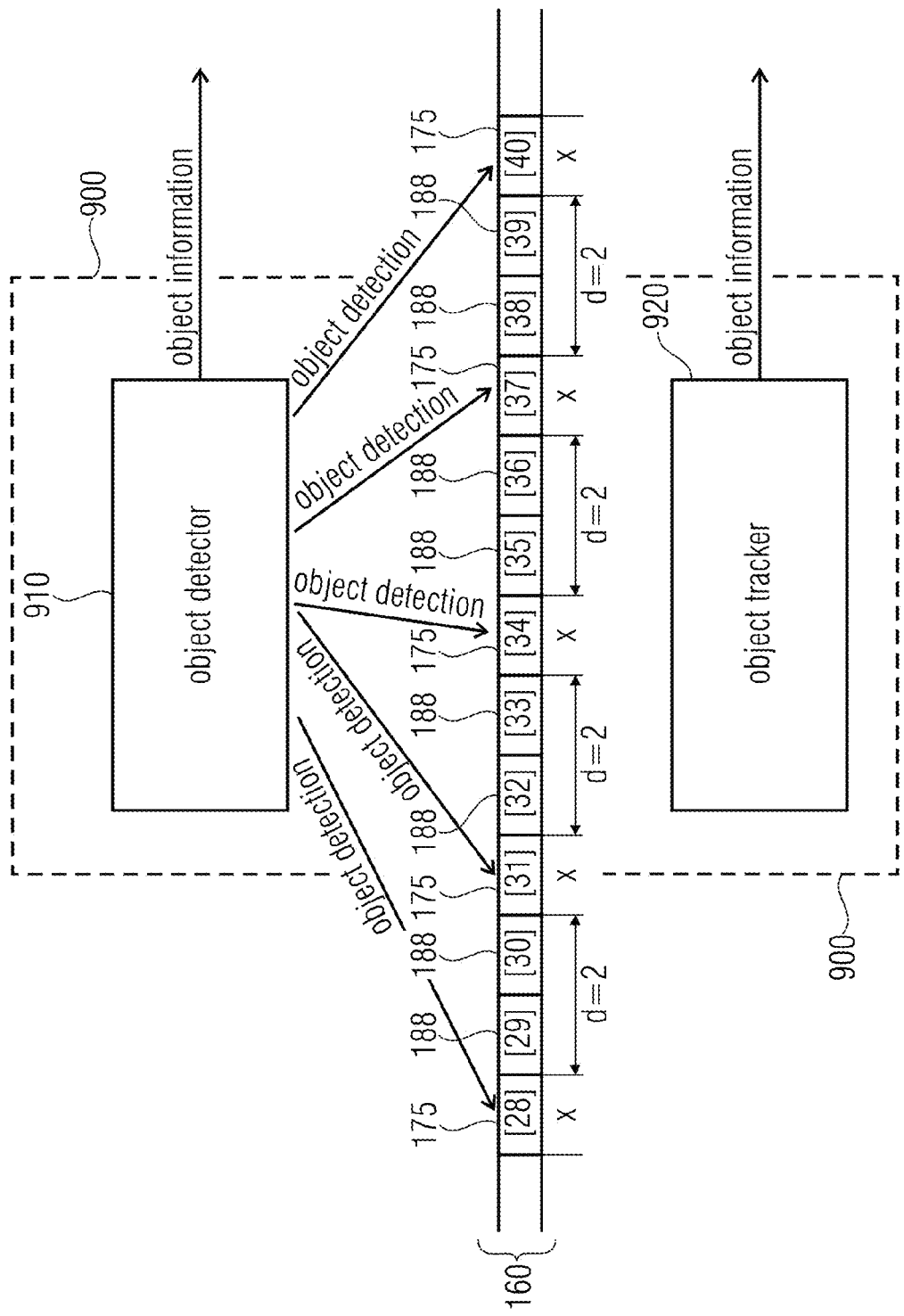

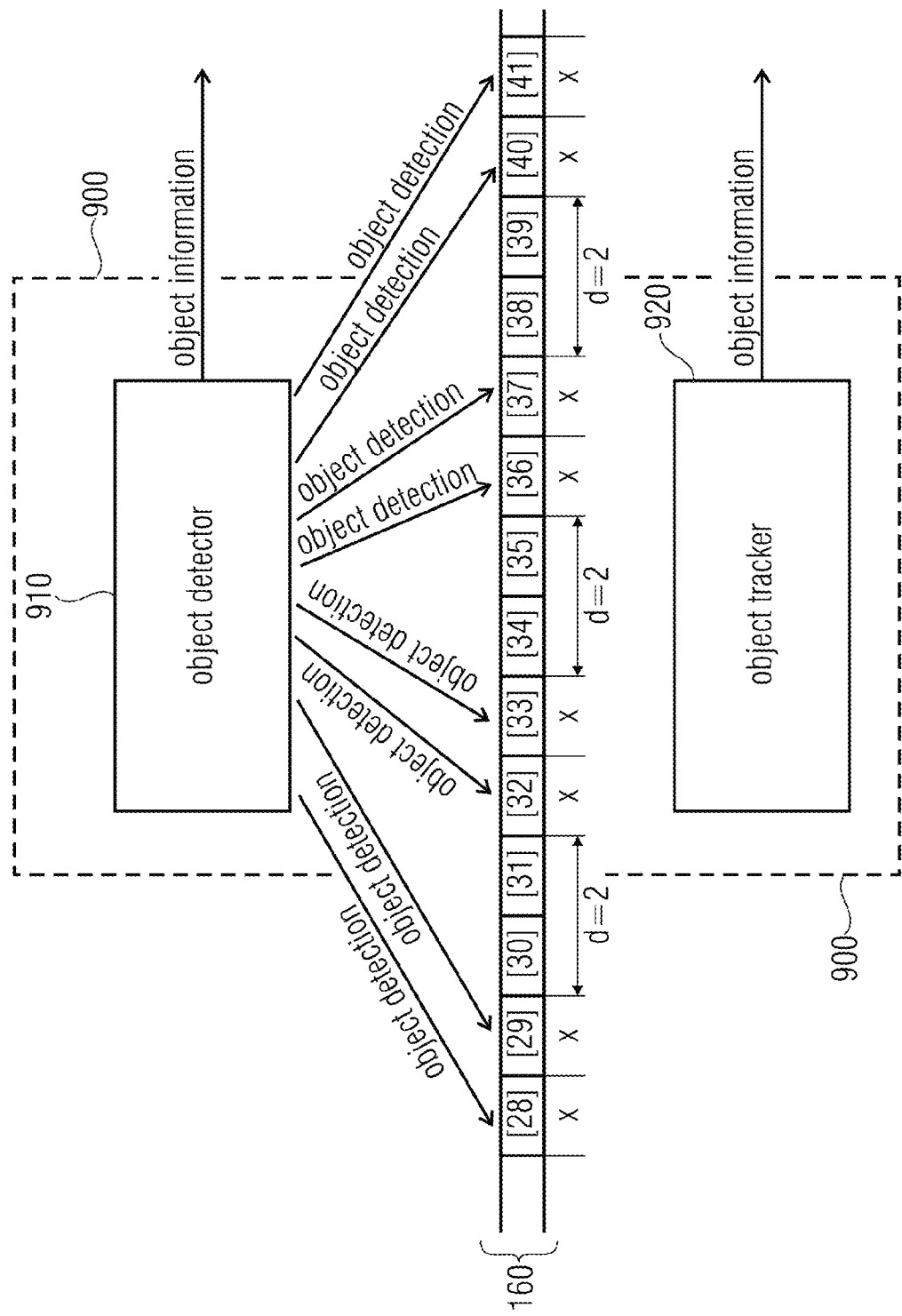

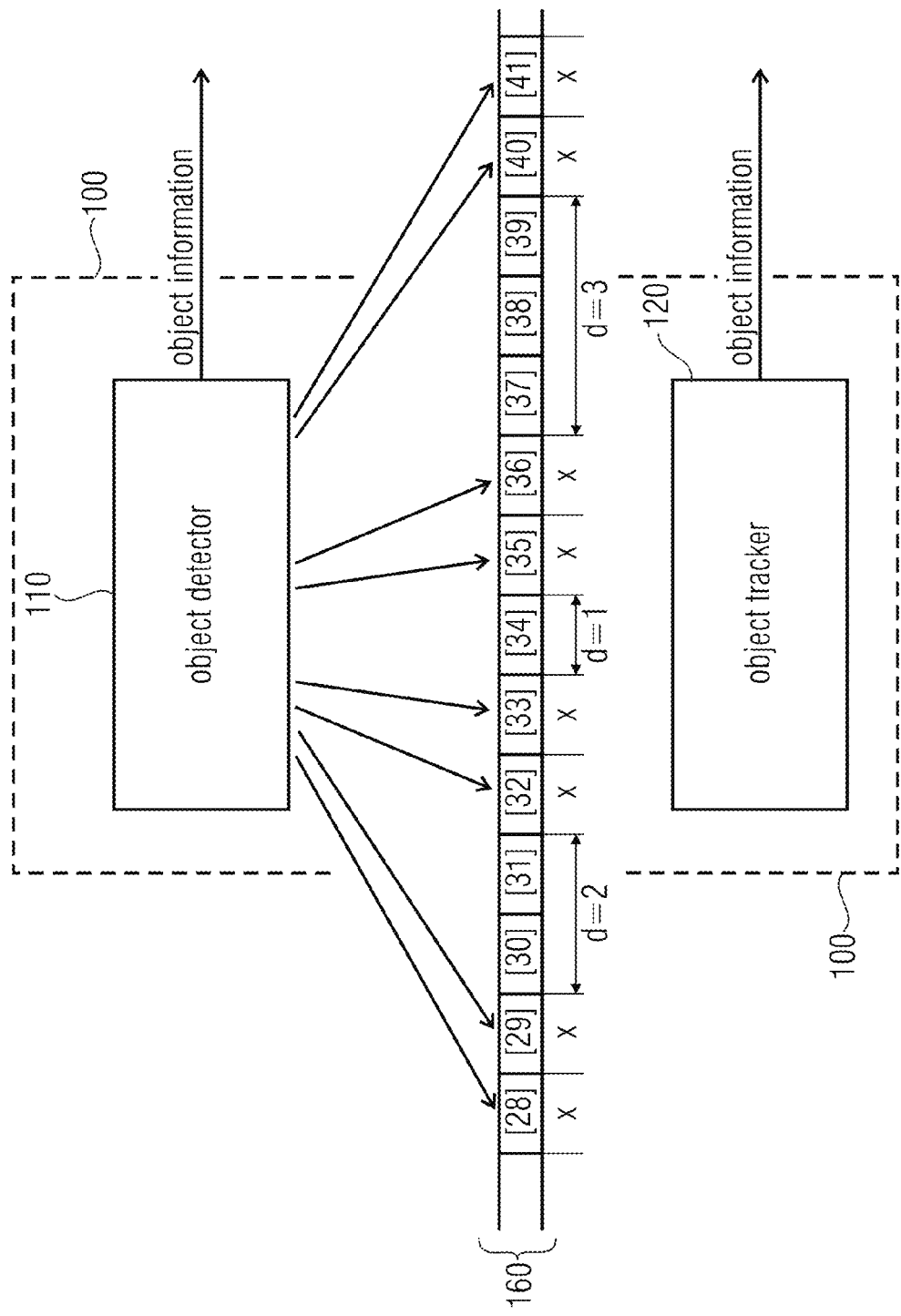

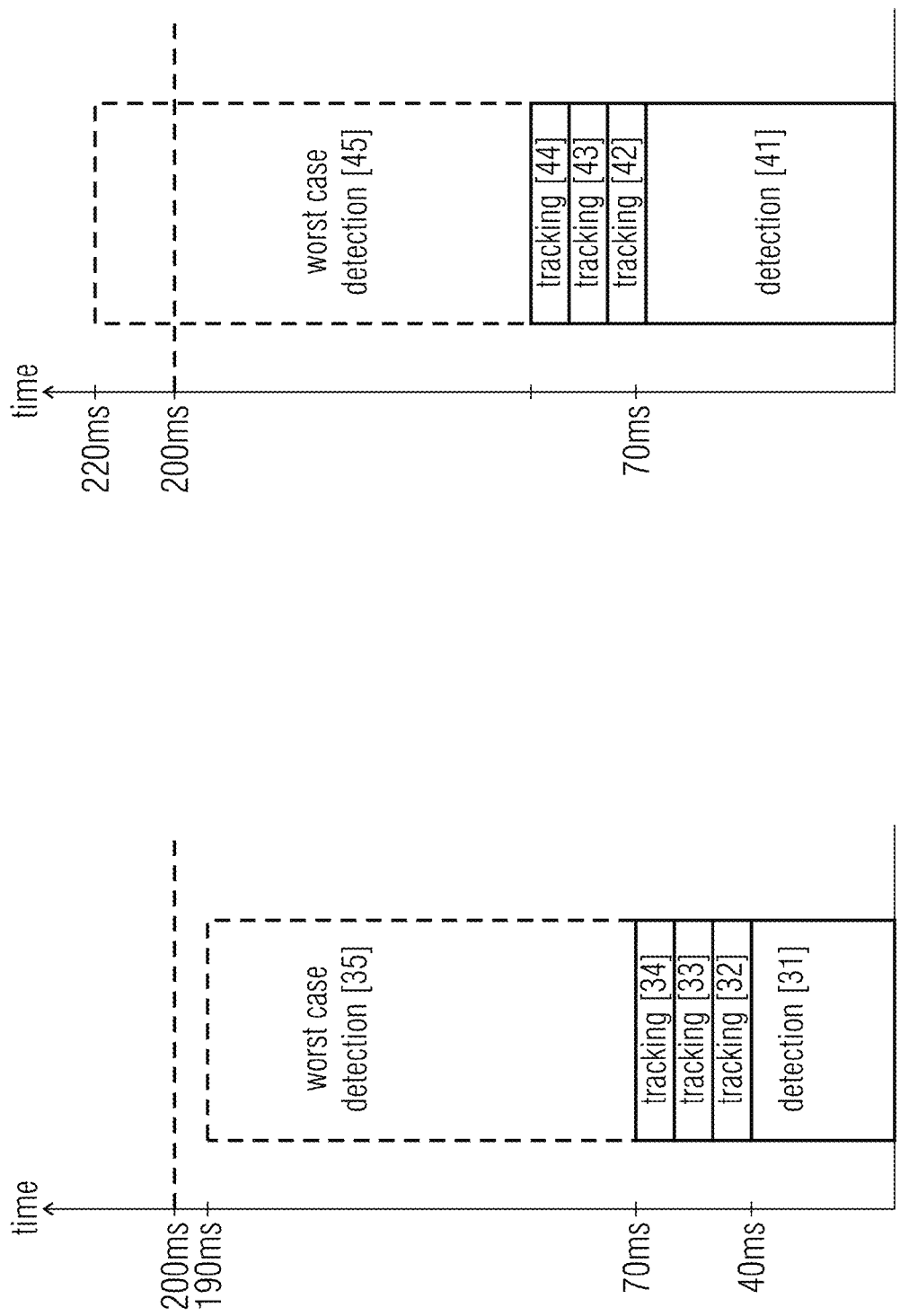

APPARATUS AND METHOD FOR RESOURCE-ADAPTIVE OBJECT DETECTION AND TRACKING

CROSS-REFERENCE TO RELATED APPLICATIONS

This application is a continuation of copending International Application No. PCT/EP2014/066247, filed Jul. 29, 2014, which is incorporated herein by reference in its entirety, and additionally claims priority from European Application No. EP13178529.7, filed Jul. 30, 2013, which is also incorporated herein by reference in its entirety.

BACKGROUND OF THE INVENTION

The present invention relates to object detection and tracking, and, in particular, to an apparatus and method for resource-adaptive object detection and tracking.

Object detection and in particular face detection became very popular in recent years. It enables, for instance, cameras to focus on the faces in the image or to adapt the camera settings accordingly. Due to the restricted processing power of embedded devices, such systems can only detect a limited number of faces or detect the faces only with low frame rates in images with high resolutions. These restrictions pose no problems for digital cameras, because it suffices to detect only the most prominent faces in the image. However, some applications necessitate a system that detects all objects of interest in the image with high frame rates and small object sizes as well. Current systems cannot afford all these requirements simultaneously on hardware with low processing power, even when using fast object detection algorithms. The most famous method for rapid object detection has been published by Viola and Jones (P. Viola and M. Jones, "Rapid object detection using a boosted cascade of simple features," In *IEEE Conference on Computer Vision and Pattern Recognition*, volume 1, pages 511-518, Kauai, HI, USA, April 2001; and P. Viola and M. Jones, "Robust real-time object detection," *International Journal of Computer Vision*, 57(2): 137-154, 2002]. Many variants or different methods have been published by other authors (see A. Ernst, T. Ruf, and C. Kueblbeck, "A modular framework to detect and analyze faces for audience measurement systems," In *2nd Workshop on Pervasive Advertising*, pages 75-87, Luebeck, 2009; B. Froeba and C. Kueblbeck, "Robust face detection at video frame rate based on edge orientation features," In *IEEE International Conference on Automatic Face and Gesture Recognition*, pages 342-347, Los Alamitos, Calif., USA, 2002; B. Froeba, "Verfahren zur Echtzeit-Gesichtsdetektion in Grauwertbildern," Shaker, 2003; B. Froeba and A. Ernst, "Fast frontal-view face detection using a multi-path decision tree," In *Audio- and Video-Based Biometric Person Authentication*, pages 921-928, 2003; C. Kueblbeck and A. Ernst, "Face detection and tracking in video sequences using the modified census transformation," In *Image and Vision Computing*, 24(6):564-572, 2006; R. Lienhart and J. Maydt, "An extended set of haar-like features for rapid object detection," In *IEEE ICIP*, volume 1, pages 900-903, 2002; H. A. Rowley, S. Baluja, and T. Kanade, "Neural network-based face detection," *IEEE Transactions on Pattern Analysis and Machine Intelligence*, 20(1):23-38, 1998; and B. Wu, A. Haizhou, H. Chang, and L. Shihong, "Fast rotation invariant multi-view face detection based on Real Adaboost," In *Sixth IEEE International Conference on Automatic Face and Gesture Recognition*, pages 79-84, 2004). In US Patent Application Publication No. 2009/0169067 A1 published Jul. 2, 2009, a face detection and tracking method is executed by a computer or a microprocessor with computing capability for identifying human faces and positions thereof in image frames.

However, it would be appreciated if more efficient concepts would be provided.

SUMMARY

According to an embodiment, an apparatus for providing object information based on an image sequence having a plurality of images may have: an object detector for conducting object detection on three or more images of the plurality of images of the image sequence to obtain a result of the object detection as the object information, wherein each image of the image sequence on which object detection is conducted, is an object-detected image of the image sequence, and wherein each image of the image sequence on which object detection is not conducted, is not an object-detected image of the image sequence, and an object tracker for conducting object tracking on one or more images of the image sequence to obtain a result of the object tracking as the object information, wherein the object detector is adapted to conduct object detection and the object tracker is adapted to conduct object tracking such that an object detection distance is different for at least two pairs of two object-detected images of the image sequence, wherein the object detection distance is defined for each pair of two object-detected images of the image sequence, for which at least one image exists between said two object-detected images within the image sequence, and for which no object-detected image exists between said two object-detected images within the image sequence, as the number of images between said two object-detected images within the image sequence, which are not object-detected images, wherein the apparatus furthermore may have a receiving interface, a detection queue, a tracking queue and a queue controller, wherein the receiving interface is configured to receive the plurality of images of the image sequence, and wherein the receiving interface is configured to store at least some of the images of the image sequence within the detection queue, wherein the queue controller is configured to move one or more images, being stored in the detection queue, from the detection queue to the tracking queue depending on whether object detection on one of the images of the image sequence conducted by the object detector is completed, and wherein the object tracker is configured to conduct object tracking on one of the images being stored in the tracking queue, depending on whether images are stored in the tracking queue.

According to another embodiment, a method for providing object information based on an image sequence having a plurality of images may have the steps of: conducting object detection on three or more images of the plurality of images of the image sequence to obtain a result of the object detection as the object information, wherein each image of the image sequence on which object detection is conducted, is an object-detected image of the image sequence, and wherein each image of the image sequence on which object detection is not conducted, is not an object-detected image of the image sequence, and conducting object tracking on one or more images of the image sequence to obtain a result of the object tracking as the object information, wherein object detection and object tracking is conducted such that an object detection distance is different for at least two pairs of two object-detected images of the image sequence, wherein the object detection distance is defined for each pair of two object-detected images of the image sequence, for which at least one image exists between said two object-detected images within the image sequence, and for which no object-detected image exists between said two object-detected images within the image sequence, as the number of images between said two object-detected images within the image sequence, which are not object-detected images, wherein the method may further have the steps of: receiving the plurality of images of the image sequence, storing at least some of the images of the image sequence within a detection queue, moving one or more images, being stored in the detection queue, from the detection queue to a tracking queue depending on whether object detection on one of the images of the image sequence conducted by the object detector is completed, and conducting object tracking on one of the images being stored in the tracking queue, depending on whether images are stored in the tracking queue.

Another embodiment may have a non-transitory digital storage medium having computer-readable code stored thereon to perform the inventive method when being executed on a computer or signal processor.

An apparatus for providing object information based on an image sequence comprising a plurality of images is provided. The apparatus comprises an object detector for conducting object detection on three or more images of the plurality of images of the image sequence to obtain the object information, wherein each image of the image sequence on which object detection is conducted, is an object-detected image of the image sequence, and wherein each image of the image sequence on which object detection is not conducted, is not an object-detected image of the image sequence. Moreover, the apparatus comprises an object tracker for conducting object tracking on one or more images of the image sequence to obtain the object information. An object detection distance is defined for each pair of two object-detected images of the image sequence, for which at least one image exists between said two object-detected images within the image sequence, and for which no object-detected image exists between said two object-detected images within the image sequence, as the number of images between said two object-detected images within the image sequence, which are not object-detected images. The object detection distance is different for at least two pairs of two object-detected images of the image sequence. Thus, the object detection distance may be variable.

Embodiments provide resource-adaptive concepts to find and follow objects in image sequences. Parallelization may be employed regarding the object detection task and the object tracking task. In some embodiments, object detection may be executed as often as feasible and may be supported by a fast object tracking method whenever object detection was skipped. According to some embodiments, an image queue may be employed to process as many images as possible and compensate for different execution times of detection and tracking.

The proposed concepts are based on that many applications allow some latency between image capture and availability of object detection results. In particular, a high resolution image or complex object detection task might still be processed when the following images become available and already introduces latency. Compared to the complexity of object detection algorithms, object tracking can generally be executed faster.

Some embodiments provide an apparatus with image queues, an object detector and an object tracker. The apparatus may enqueue incoming images in a queue, the object detector may process only the most recent image of the detection queue and the fast object tracker bridges all images between the key frames, where object detection was performed (each key frame may, e.g., comprise an image on which object detection will be conducted; in other words: a key frame is the frame of an image on which object detection is conducted; e.g., a key frame is a frame of an object-detected image). This allows an efficient parallelization of object detection and object tracking in multiple threads. The object detector may adapt the number of key frames automatically to the available resources. Moreover, the object tracker may synchronize with the detection results of the key frames and performs object tracking in the intermediate images (e.g., images on which object detection is not conducted).

According to an embodiment, the object detector may be configured to conduct object detection on a first one of the plurality of images of the image sequence. Moreover, the object detector may be configured to start conducting object detection on a second one of the images of the image sequence depending on when the conducting of the object detection on the first one of the plurality of images is completed.

In an embodiment, the object detector may be configured to conduct object detection on one of the plurality of images of the image sequence in parallel to the object tracker conducting object tracking on another one of the plurality of images of the image sequence. In a further embodiment, the object detector may be configured to employ at least two processes or at least two threads to conduct object detection on said one of the plurality of images in parallel. Alternatively or additionally, the object tracker may be configured to employ at least two processes or at least two threads to conduct object tracking on said another one of the plurality of images of the image sequence in parallel.

According to an embodiment, the apparatus may furthermore comprise a receiving interface and an image queue. The receiving interface may be configured to receive the plurality of images of the image sequence, and wherein the receiving interface may be configured to store at least some of the images of the image sequence within the image queue.

In an embodiment, the object detector may be configured to select, when two or more images of the image sequence are stored in the image queue, an image of the two or more images of the image sequence being stored in the image queue, which has most recently been received by the receiving interface among all images of the two or more images of the image sequence being stored in the image queue. Moreover, the object detector may be configured to conduct object detection on the selected image.

In another embodiment, the receiving interface may be configured to not store an image of the image sequence received by the receiving interface within the image queue, when the number of images that are stored in the image queue is equal to a maximum number.

According to an embodiment, the object detector may be configured to obtain a detection result by conducting object detection on one of the plurality of images of the image sequence. The object tracker may be configured to receive the detection result. Moreover, the object tracker may be configured to retrieve at least one of the images of the image sequence from the image queue when the object tracker has received the detection result. Furthermore, the object tracker may be configured to conduct object tracking on said at least one of the images retrieved from the image queue based on the detection result.

In an embodiment, the image queue may be a detection queue. Furthermore, the apparatus further may comprise a tracking queue. Moreover, the apparatus may further comprise a queue controller. The queue controller may be configured to move one or more images, being stored in the detection queue, from the detection queue to the tracking queue depending on whether object detection on one of the images of the image sequence conducted by the object detector is completed. The object tracker may be configured to conduct object tracking on one of the images being stored in the tracking queue, depending on whether images are stored in the tracking queue.

According to an embodiment, the queue controller may be configured to move all images being stored in the detection queue from the detection queue to the tracking queue, depending on whether the object detection on said one of the images of the image sequence conducted by the object detector is completed.

In an embodiment, the apparatus may further comprise one or more first pointers indicating a detection queue portion of the image queue. Moreover, the apparatus may further comprise one or more second pointers indicating a tracking queue portion of the image queue. Moreover, the apparatus may further comprise a queue controller. The queue controller may be configured to modify, depending on whether object detection on one of the images of the image sequence conducted by the object detector is completed, at least one pointer of the one or more first pointers and the one or more second pointers, such that one or more images being located within the detection queue portion of the image queue before modification of said at least one pointer, are located, after the modification of said at least one pointer, within the tracking queue portion of the image queue. The object tracker may be configured to conduct object tracking on one of the images being located in the tracking queue portion of the image queue, depending on whether images are stored in the tracking queue portion of the image queue.

According to an embodiment, the object detector may be configured to conduct object detection without skipping any portion of an image on which object detection is conducted.

In an embodiment, the object detector may be configured to conduct object detection on the plurality of images of the image sequence by conducting face detection. The object tracker may be configured to conduct object tracking on the one or more images of the image sequence by conducting face tracking.

In other embodiments, the object detector is configured to conduct object detection in a first portion of a first image of the image sequence, to not conduct object detection in one or more other images of the image sequence immediately succeeding the first image within the image sequence, and to conduct object detection in a second portion of a further image immediately succeeding one of the one or more other images.

Moreover, a method for providing object information based on an image sequence, comprising a plurality of images, is provided. The method comprises:

Conducting object detection on three or more images of the plurality of images of the image sequence to obtain the object information, wherein each image of the image sequence on which object detection is conducted, is an object-detected image of the image sequence, and wherein each image of the image sequence on which object detection is not conducted, is not an object-detected image of the image sequence; and Conducting object tracking on one or more images of the image sequence to obtain the object information.

An object detection distance is defined for each pair of two object-detected images of the image sequence, for which at least one image exists between said two object-detected images within the image sequence, and for which no object-detected image exists between said two object-detected images within the image sequence, as the number of images between said two object-detected images within the image sequence, which are not object-detected images. The object detection distance is different for at least two pairs of two object-detected images of the image sequence.

Moreover, a computer program for implementing the above-described method when being executed on a computer or signal processor is provided.

BRIEF DESCRIPTION OF THE DRAWINGS

Embodiments of the present invention will be detailed subsequently referring to the appended drawings, in which:

FIGS. 1a-1c illustrate an apparatus for providing object information based on an image sequence comprising a plurality of images according to an embodiment;

FIG. 1d illustrates an apparatus for providing object information, which employs a regular object detection scheme;

FIG. 1f illustrates another apparatus for providing object information, which employs a regular object detection scheme;

FIG. 1g illustrates an apparatus for providing object information based on an image sequence comprising a plurality of images according to another embodiment;

FIGS. 3a and 3b illustrate a scenario, where object detection is not conducted in parallel;

DETAILED DESCRIPTION OF THE INVENTION

Figure 1C:
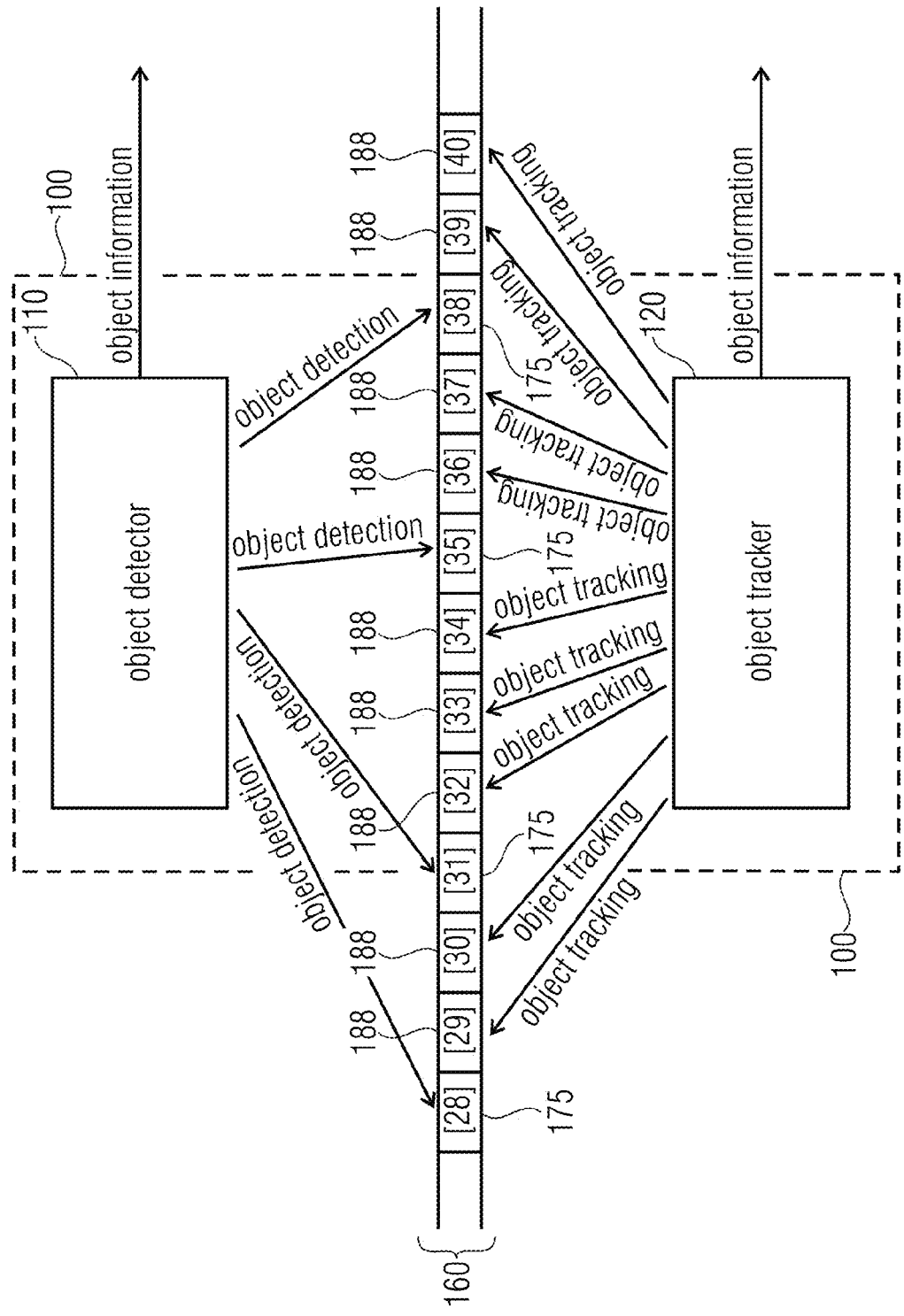

FIG. 1a illustrates an apparatus 100 for providing object information based on an image sequence 160 comprising a plurality of images 170 according to an embodiment.

The apparatus of FIG. 1a comprises an object detector 110 and an object tracker 120.

FIG. 1a also illustrates the image sequence 160. The image sequence 160 comprises a plurality of images 170. It is an inherent property of every sequence that the members of the sequence are ordered within the sequence. Likewise, the images 170 of the image sequence illustrated by FIG. 1a are ordered within the image sequence 160. In FIG. 1a, the images 170 of the image sequence 160 are already illustrated in order. In particular, FIG. 1a illustrates in square brackets an assumed position of each of the images 170 within the image sequence. For example, in FIG. 1a, the first depicted image 170 is the 28th image of the image sequence 160, the second depicted image 170 is the 29th image of the image sequence 160, the third depicted image 170 is the 30th image of the image sequence 160, and the last depicted image 170 is the 40th image of the image sequence 160 (see the numbers in square brackets in FIG. 1a: [28], [29], [30], . . . , [40]). The order of the images 170 within the image sequence 160 is important: For example, the images 170 may be images of a recorded video and to replay the video, it is important to know, in which order the images 170 have been recorded.

For a lot of applications, it is important information on objects illustrated by one or more images of an image sequence. Such object information may, for example, be information on the location of one or more objects in images of an image sequence. Moreover, such information may, for example, be the movement of such objects in subsequent images of the image sequence. Other information may also be taken into account, e.g., the type of the object (a face, or a car, a person or a hand), or an orientation of a face (front profile, semi profile, profile or angle information).

Object detection and object tracking are known in the art to provide information on objects illustrated by images of an image sequence.

Object detection techniques search objects within an image, e.g., by employing image processing techniques, e.g., in general, without using a priori information on the about location of the objects within the image.

Object tracking techniques "follow" objects in a sequence of images. E.g., in general, object tracking techniques use information on the position of an object in a first image, and for example, assume that the position of the object of first image does not change that much in a further, e.g., subsequent, image of the image sequence. Image tracking techniques then, e.g., determine how the position of the object has changed in a subsequent image.

FIG. 1b and FIG. 1c illustrate further aspects of the apparatus of FIG. 1a, using a combined approach employing object detection and object tracking.

As illustrated by FIG. 1b, the object detector 110 is configured to conduct object detection on some (e.g., three or more images) of the plurality of images of the image sequence 160 to obtain the object information.

In FIG. 1b, object detection is conducted on image [28], [31], [35] and by the object detector 110.

Each image of the image sequence 160 on which object detection is conducted is an object-detected image 175 of the image sequence.

Each image of the image sequence 160 on which object detection is not conducted is not an object-detected image of the image sequence. In FIG. 1b, the images on which object detection is not conducted are indicated by reference sign 188.

As illustrated by FIG. 1c, the object tracker 120 is configured to conduct object tracking on one or more images of the image sequence to obtain the object information.

In FIG. 1c, object tracking is conducted on image [29], [30], [32], [33], [34], [36], [37], [38], [39] and [40] of the image sequence.

In the example of FIG. 1c, object tracking on the images [29] and [30] is conducted depending on the result of the object detection conducted on image [28]. For example, the one or more objects detected in image [28] are tracked by conducting object tracking on images [29] and [30]. It should be noted, however, that object tracking also may be conducted on the images on which object detection has been conducted.

Object tracking on the images [32], [33] and [34] is conducted depending on the result of the object detection conducted on image [31]. It is advantageous to not only rely on the object detection conducted on image [28], but to again conduct object detection on a further image, here, image [31], for example, because objects that were not present in image [28] may appear in image [31], and, e.g., because tracked objects may "drift away" and so, in some cases, object tracking may no longer provide reliable tracking results, when object detection is not conducted repeatedly.

Consequently, object detection is also conducted on image [35], and object tracking on the images [36] and [37] is conducted depending on the result of the object detection conducted on image [35]. And, object tracking on the images [39] and [40] is conducted depending on the result of the object detection conducted on image [38].

In the example of FIG. 1c, object tracking is conducted on all images, on which object detection is not conducted. In further embodiments, object tracking is not conducted on all images on which object detection has not been conducted. Instead, in these embodiments, some images on which object detection has not been conducted, are skipped as far as object tracking is concerned, for example, to meet to constraints, e.g., imposed by real-time requirements. However, in other embodiments, object tracking is also conducted on the images on which object detection has been conducted.

The results of the object detection conducted by the object detector 110 and the results of the object tracking conducted by the object tracker 120 may, for example, be provided as the object information. For example, information of one or more objects in one or more or in all of the images of the image sequence may be output as object information.

In a particular embodiment, the objects to be detected and/or to be tracked may be faces. In such an embodiment, the object detector 110 may be configured to conduct object detection on the plurality of images of the image sequence by conducting face detection. The object tracker 120 may be configured to conduct object tracking on the one or more images of the image sequence by conducting face tracking.

Arriving at the above-described features of embodiments necessitates a plurality of considerations.

Some with ordinary skill in the art would recommend conducting object detection on each image of the image sequence. However, in general, object detection necessitates a considerable amount of time compared to object tracking. In other words: in general, object detection is slower than object tracking. Based on that finding, it is advantageous to not conduct object detection on each frame, but to conduct object tracking on some of the images of the image sequence, if time constraints are an issue.

If arriving at this finding, some with ordinary skill in the art would recommend conducting object detection on a single image only and then conduct object tracking on all other frames. Instead, embodiments are based on the finding that objects may drift away in subsequent images and new objects may appear and so, object detection should be repeated after a first object detection has been conducted. Therefore, according to embodiments, object detection is conducted on not only a single image, but on some (three or more) images of the image sequence.

If arriving at this further finding, a person with ordinary skill in the art would recommend conducting object detection every few frames of a fixed number/every few images of a fixed number. For example, a person with ordinary skill in the art may recommend to conduct object detection every four images and to conduct object tracking on the other images. For example, according to this, object detection would be conducted on the first image, the fifth image, the ninth image and so on. Applying ordinary considerations, such an approach is reasonable, as such an approach can be easily realized, e.g., by employing programming loops, e.g., while-loops or for-loops.

However, based on further findings, embodiments follow a different approach, as will be explained later on with reference to the following definition, being illustrated by FIG. 1d and FIG. 1 e, which is now provided.

FIG. 1d depicts an apparatus 900 of comprising an object detector 910 and an object tracker 920 illustrating a scenario, where object-detection is conducted every three images within the image sequence 160, and no object detection is conducted on the other frames of the image sequence 160. Thus, in FIG. 1d, the object detector 910 of the apparatus 900 conducts object detection on images [28], [31], [34], [37] and [40] (the object-detected images 175, marked by a cross), but not on the other images [29], [30], [32], [33], [35], [36], [38], [39] (indicated by reference sign 188).

An object detection distance is defined for each pair of two object-detected images of the image sequence 160, for which at least one image exists between said two object-detected images within the image sequence, and for which no object-detected image exists between said two object-detected images within the image sequence, as the number of images between said two object-detected images within the image sequence, which are not object-detected images.

According to this definition, in FIG. 1d, an object detection distance is defined for the object-detected image pair ([28], [31]), for the object-detected image pair ([31], [34]), for the object-detected image pair ([34], [37]), and for the object-detected image pair ([37], [40]), because no object-detected image exists between the object-detected images of these pairs, and at least one image exists between the object-detected images of these pairs.

For example, regarding the object-detected image pair ([28], [31]), an object detection distance is defined for this pair, because at least one image is located between them within the image sequence (namely, image [29] and [30]), and none of the images between them (images [29] and [30]) is an object-detected image.

In contrast, for the pair ([28], [34]), an object detection distance is not defined for this pair, because the object-detected image [31] is located between the object-detected images [28] and [34].

Of course, an object detection distance is not defined for pair ([28] and [32]), because, image [32] in not an object-detected image, as object detection has not been conducted on image [32].

In FIG. 1d, the object detection distance of object-detected image pair ([28], [31]) is 2, as the number of images between said two object-detected images [28] and [31] within the image sequence, which are not object-detected images, is 2 (images [29] and [30] are between the object-detected images [28] and [31], thus the object detection distance d of pair ([28], [31]) is d=2).

Likewise, the object detection distance of the object-detected image pair ([31], [34]) is 2. Moreover, the object detection distance of the object-detected image pair ([34], [37]) is 2, and the object detection distance of the object-detected image pair ([37], [40]) is also 2.

The approach of FIG. 1d is to repeat object detection on a constant basis, e.g., conducting object detection every few frames of a fixed number.

However, the inventors have found that following another approach is particularly advantageous:

According to embodiments, the object detection distance is different for at least two pairs of two object-detected images of the image sequence. Thus, an apparatus 100 according to embodiments comprises an object detector 110 which is adapted to conduct object detection so that the object detection distance is different for at least two pairs of two object-detected images of the image sequence.

Figure 1E:
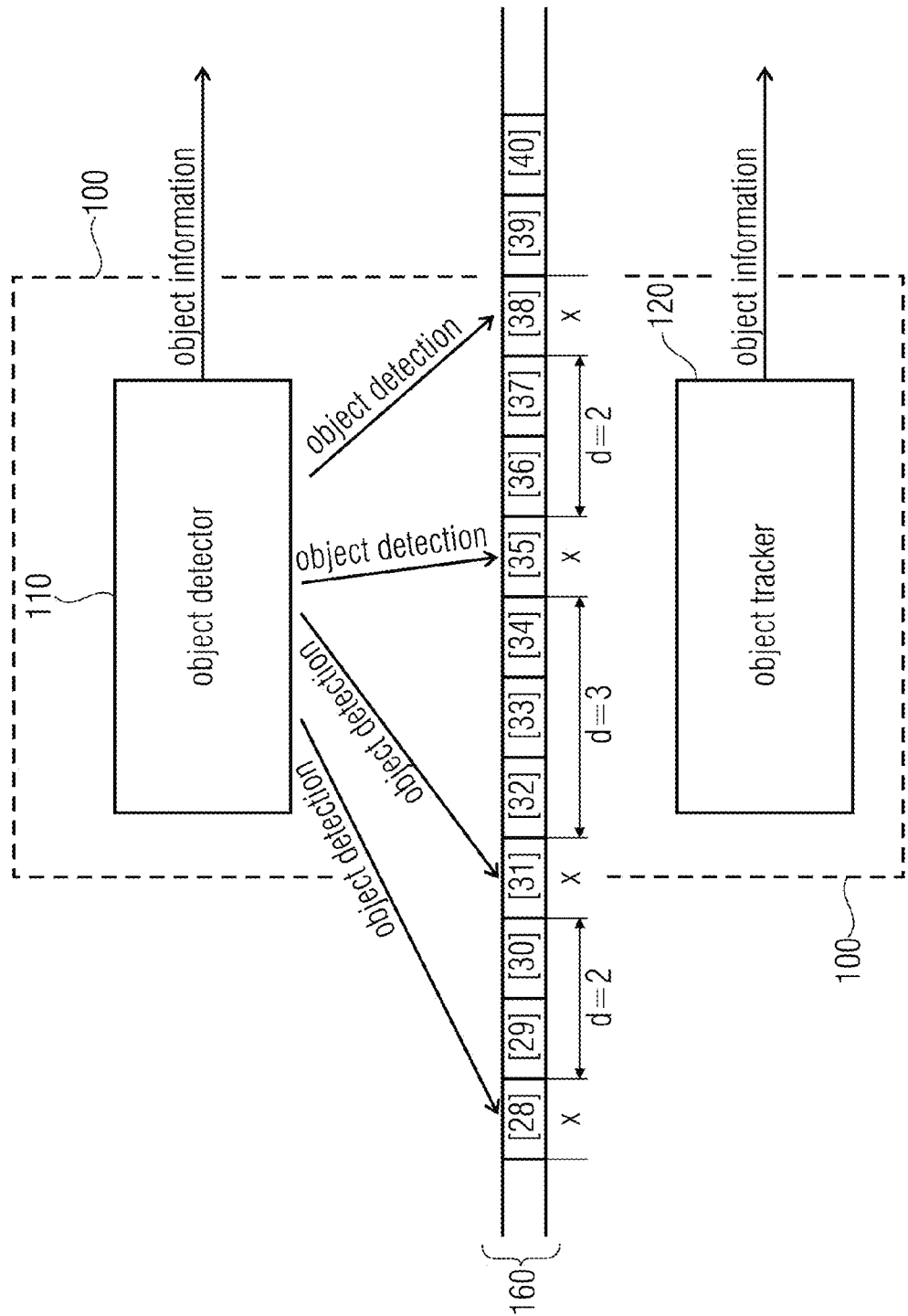
FIG. 1e illustrates a further aspect of the apparatus illustrated by FIGS. 1a-1c.

FIG. 1e illustrates this further aspect of the apparatus 100 already illustrated by FIGS. 1a-1c. In FIG. 1e, the object detector 110 conducts object detection on the images [28], [31], [35] and [38], which are thus object-detected images, but object-detection is not conducted on the other images 188, (the images [29], [30], [32], [33], [34], [36], [37], [39], [40]).

According to the above-provided definition, an object detection distance is thus defined for the object-detected image pairs ([28], [31]), ([31], [35]) and ([35], [38]).

For the object-detected image pair ([28], [31]) the object detection distance d is d=2, because 2 non-object-detected images [29] and [30] are situated between the object-detected images [28] and [31]. For the object-detected image pair ([31], [34]) the object detection distance d is d=3. And for the object-detected image pair ([35], [38]) the object detection distance d is d=2. Thus, the object detection distance is different for two pairs of two object-detected images of the image sequence, e.g., for the two pairs ([28], [31]: d=2) and ([31], [35]: d=3). Also, the object detection distance is different for the two pairs ([31], [35]: d=3) and ([35], [38]: d=2).

The embodiment of FIG. 1e is based on the finding that the time needed for object detection varies from image to image.

For example, object detection may be conducted by conducting two stages. In a first stage of the object detection, a coarse search may be conducted on the image. In the coarse search, first portions of the image are identified where objects may possibly be located, and second portions of the image are identified where objects of the image are definitely not located. In a second stage of the object detection, a fine search is conducted only on the first portions to determine whether objects are really located within the first portions. The second portions are excluded from the second stage of object detection. If a lot of first portions have been identified in the first stage of object detection, then the second stage of object detection lasts considerably longer compared to when only a few first portions have been identified in the first stage of object detection.

No matter whether object detection and object tracking are conducted in parallel or not, it is useful to vary the object detection distance in any case.

According to one embodiment illustrated by FIGS. 3a and 3b, object detection is not conducted in parallel. It is assumed that a time constraint exists according to which five images have to be processed in at most 200 ms by conducting either object detection or object tracking. It is moreover assumed that it is known that object tracking is conducted in 10 ms for each image and moreover, that it is known that object detection takes between 20 ms and 120 ms.

In a first case illustrated by FIG. 3a, object detection has been conducted on image [31]. Object detection has been completed after 40 ms. Then object tracking has been conducted on images [32], [33] and [34], wherein object tracking took 10 ms, each, such that processing the four images in total took 70 ms. If the apparatus would now conduct object detection on image [35], even in the worst case of a duration of 120 ms for conducting object detection, this sums up to 190 ms, and still the time constraint of processing the five images in at most 200 ms would be met. The apparatus thus can conduct object detection on image [35], and this results in an object detection distance of 3 for the object-detected image pair ([31], [35]).

In a second case illustrated by FIG. 3b, object detection has been conducted on image [41]. In the second case, object detection has been completed after 70 ms. Then object tracking has been conducted on images [42], [43] and [44], wherein object tracking took 10 ms, each, such that processing the four images in total took 100 ms. If the apparatus would now conduct object detection on image [45], in the worst case of a duration of 120 ms for conducting object detection, this sums up to 220 ms, and in the worst case the time constraint of processing the five images in at most 200 ms would not be met. The apparatus is thus not allowed to conduct object detection on image [45]. Instead the apparatus would conduct object tracking on image [45], and object detection, would, for example be conducted on image [46], which results in an object detection distance of 4 for the object-detected image pair ([41], [46]).

In the first case, it is advantageous to conduct object detection early already on image [35], because early object detection provides better object information results, e.g., because new objects can be detected earlier. In the second case, it is advantageous to conduct object detection later and not already on image [45], because otherwise, the time constraint would be in danger. Thus, it is advantageous, if the object detection distance varies.

According to another embodiment object detection is conducted in parallel. In such an embodiment, the object detector is configured to conduct object detection on one of the plurality of images of the image sequence in parallel to the object tracker conducting object tracking on another one of the images of the image sequence.

For example, a first process is employed to conduct object detection and a second process is employed to conduct object tracking. According to another embodiment, a first thread is employed to conduct object detection and a second thread is employed to conduct object tracking.

It is assumed that object detection takes between 60 ms and 90 ms and it is further assumed that object tracking takes 10 ms. If the object detection distance would be set to a fixed number, then a worst case assumption would have to be made that object detection takes 90 ms. E.g. it may be assumed that object tracking (which is assumed to take 10 ms) is conducted on 9 objects before object detection of a single image (worst case duration: 90 ms) is finished. For that, if the object detection distance would be set to a fixed number, the object detection distance would be set to 9 and object detection would, for example, be conducted on the 11th image, 21th image, 31th image, 41th image and so on. However, in reality, often, object detection will be finished earlier than in the worst case, and in all those cases, the process for conducting object detection is then unused for a certain amount of time. In those cases, it would be better, if the object detection distance would vary depending on the actual execution time of object detection, instead of being set to a fixed number of frames.

Another embodiment is based on these findings. In such an embodiment, the object detector 110 is configured to conduct object detection on a first one of the plurality of images of the image sequence. Moreover, the object detector 110 is configured to start conducting object detection on a second one of the images of the image sequence depending on when the conducting of the object detection on the first one of the plurality of images is completed. For example, immediately after object detection of a first one of the images of the image queue is completed by the object detector 110, object detection of a further one of the images of the image queue is conducted by the object detector 110.

With respect to the aspect of parallelization, in a further embodiment, the object detector 110 is configured to employ at least two processes or at least two threads to conduct object detection on an image in parallel. For example, object detection may be conducted by creating a plurality of copies of the image in different sizes. An object pattern is then searched for in each of the differently sized copies of the image. Object detection may then be conducted in parallel, wherein an individual process or thread is employed for searching the pattern in each of the differently sized copies of the image. Alternatively or additionally, the object tracker 120 is configured to employ at least two processes or at least two threads to conduct object tracking on another image in parallel.

Returning once again to the definition of the object detection distance, reference is made to FIG. 1f. Object detection is conducted on the images [28], [29], [32], [33], [36], [37], [40] and [41], but object detection is not conducted on the images [30], [31], [34], [35], [38] and [39].

The object detector 910 of FIG. 1f may conduct object detection on a first portion (e.g. a top image portion) of image [28], and may conduct object detection on a second portion (e.g. a bottom image portion) of image [29]. Object tracking is conducted on the next two images [30] and [31] by the object tracker 920.

Again, the object detector 910 may conduct object detection on a first portion (e.g. a top image portion) of image [32], and may conduct object detection on a second portion (e.g. a bottom image portion) of image [33]. Again, object tracking is conducted on the next two images [34] and [35] by the object tracker 920, and so on.

The object detection pattern that is applied by the apparatus 900 of FIG. 1f is regular and does not vary. The above-described disadvantages of such a regular setting, which lacks flexibility, are present. The definition of the object detection distance expresses the regularity.

In FIG. 1f, an object detection distance is defined for each of the object-detected image pairs ([29], [32]), ([33], [36]), and ([37], [40]). In particular, an object detection image is not defined, e.g., for the object-detected image pair ([28], [32]), because another object-detected image is located between image [28] and image [32], namely object-detected image [29]. Moreover, in particular, an object detection distance is not defined for the object-detected image pair ([32], [33]) because no other image is located between image [32] and [33].

In FIG. 1f, the object detection distance for each of the object-detected image pairs ([29], [32]), ([33], [36]), and ([37], [40]) is d=2, as exactly two images on which object detection is not conducted is located between each of said pairs. The object detection distance of the object-detected image pairs of FIG. 1f does not vary and consequently no two object-detected image pairs exist which have a different object detection distance.

FIG. 1g illustrates an apparatus 100 according to another embodiment.

The object detector 110 of FIG. 1g conducts object detection on a first portion (e.g. a top image portion) of image [28], and conduct object detection on a second portion (e.g. a bottom image portion) of image [29]. Object tracking is conducted on the next two images [30] and [31] by the object tracker 120.

Again, the object detector 110 conducts object detection on a first portion (e.g. a top image portion) of image [32], and conducts object detection on a second portion (e.g. a bottom image portion) of image [33]. Object tracking is conducted on image [34] by the object tracker 920.

Again, the object detector 110 conducts object detection on a first portion (e.g. a top image portion) of image [35], and conducts object detection on a second portion (e.g. a bottom image portion) of image [36]. Object tracking is conducted on the images [37], [38] and [39] by the object tracker 920.

Again, object detection is conducted on the images [40] and [41].

The object detection pattern illustrated in FIG. 1g is irregular. For example, the apparatus of FIG. 1g takes different durations of object detections for different images into account. By this, the apparatus of FIG. 1g provides more flexibility than the apparatus of FIG. 1f.

In FIG. 1g, an object detection distance is defined for each of the object-detected image pairs ([29], [32]), ([33], [35]), and ([36], [40]). In FIG. 1g, the object detection distance for the object-detected image pair ([29], [32]) is d=2, the object detection distance for the object-detected image pair ([33], [35]) is d=1, and the object detection distance for the object-detected image pair ([36], [40]) is d=3. Thus, the object detection distance of the object-detected image pairs of FIG. 1g varies and consequently two object-detected image pairs exist which have a different object detection distance, e.g., the two object-detected image pairs ([29], [32]), ([33], [35]), e.g., the two object-detected image pairs ([33], [35]), ([36], [40]), or, e.g., the two object-detected image pairs ([29], [32]), ([36], [40]).

In other embodiments, the object detector 110 is configured to conduct object detection in a first portion of a first image of the image sequence, to not conduct object detection in one or more other images of the image sequence immediately succeeding the first image within the image sequence, and to conduct object detection in a second portion of a further image immediately succeeding one of the one or more other images.

Figure 4A:
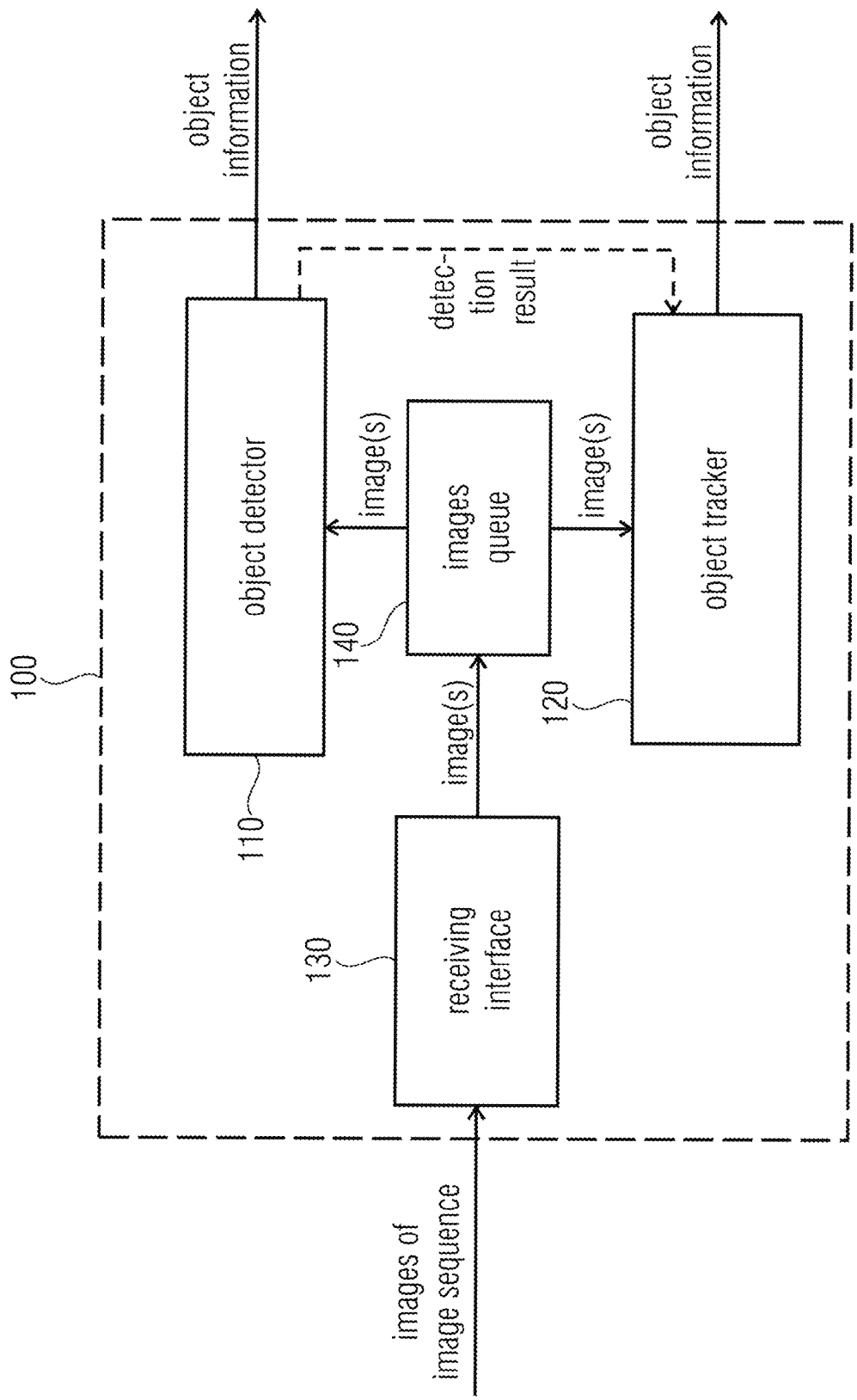
FIG. 4a illustrates an apparatus for providing object information based on an image sequence comprising a plurality of images according to a further embodiment.

FIG. 4a illustrates an apparatus 100 according to another embodiment, wherein the apparatus 100 furthermore comprises a receiving interface 130 and an image queue 140. The receiving interface 130 is configured to receive the plurality of images of the image sequence. The receiving interface 130 is configured to store at least some of the images of the image sequence within the image queue 140.

In another embodiment, the object detector 110 is configured to select as a selected image, when two or more images of the image sequence are stored in the image queue 140, an image of the two or more images of the image sequence being stored in the image queue 140, which has most recently been received by the receiving interface 130 among all images of the two or more images of the image sequence being stored in the image queue 140. Moreover, the object detector 110 is configured to conduct object detection on the selected image.

In an embodiment, the receiving interface 130 is configured to not store an image of the image sequence received by the receiving interface within the image queue 140, when the number of images that are stored in the image queue is equal to a maximum number. By this, if the capacity limit of the image queue 140 indicated by the maximum number, is reached, further receiving images are skipped.

According to an embodiment, the object detector 110 is configured to obtain a detection result by conducting object detection on one of the plurality of images of the image sequence. The object tracker 120 is configured to receive the detection result. Moreover, the object tracker 120 is configured to retrieve at least one of the images of the image sequence from the image queue when the object tracker has received the detection result. Furthermore, the object tracker 120 is configured to conduct object tracking on said at least one of the images retrieved from the image queue based on the detection result.

Figure 5:
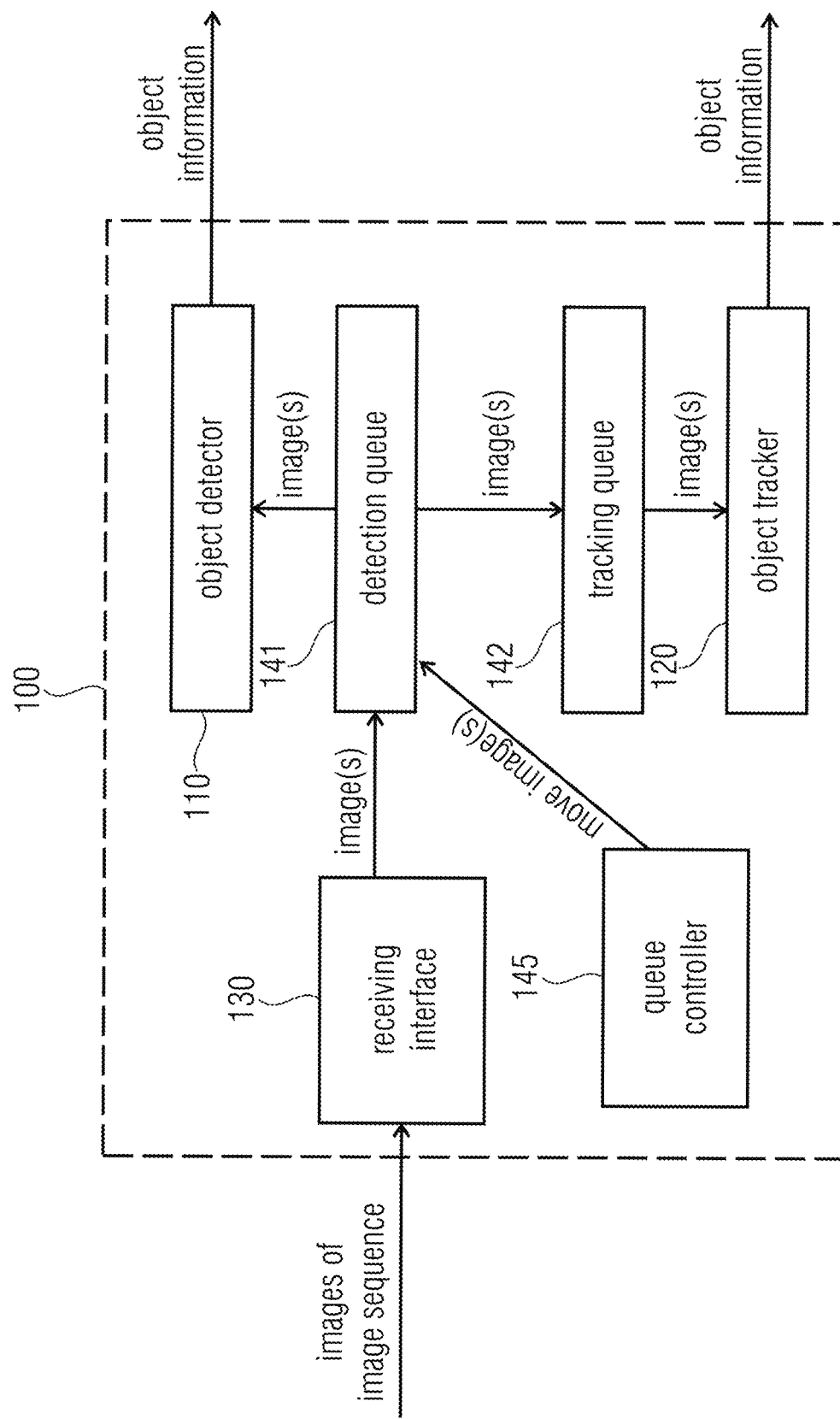
FIG. 5 illustrates an apparatus for providing object information based on an image sequence comprising a plurality of images according to a further embodiment.

In a further embodiment illustrated by FIG. 5, the image queue is a detection queue 141. Furthermore, the apparatus further comprises a tracking queue 142. Moreover, the apparatus further comprises a queue controller 145.

The queue controller 145 is configured to move one or more images, being stored in the detection queue 141, from the detection queue 141 to the tracking queue 142 depending on whether object detection on one of the images of the image sequence conducted by the object detector 110 is completed, for example, immediately after object detection on said one of the images is completed.

The object tracker 120 is configured to conduct object tracking on one of the images being stored in the tracking queue 142, depending on whether images are stored in the tracking queue 142. For example, whether object tracking can be conducted by the object tracker 120 depends on whether images are stored in the tracking queue 142.

According to an embodiment, the queue controller 145 is configured to move all images being stored in the detection queue 141 from the detection queue 141 to the tracking queue 142, depending on whether the object detection on one of the images of the image sequence conducted by the object detector 110 is completed. For example, completion of object detection on an image triggers that images are moved from the detection queue to the tracking queue.

In another embodiment, the queue controller 145 is configured to move all but one image being stored in the detection queue 141 from the detection queue 141 to the tracking queue 142, depending on whether the object detection on said one of the images of the image sequence 160 conducted by the object detector 110 is completed, wherein said one image being stored in the detection queue 141 which is not moved from the detection queue 141 to the tracking queue 142 is that image which is last received by the receiving interface 130 among all images being stored in the detection queue 141. In other words, e.g., in such an embodiment, when object detection on one of the images is completed, all but one image is moved from the detection queue to the tracking queue, but the last received image remains in the detection queue, for example, because that image is the next image on which object detection will be conducted. In such an embodiment, it is not necessitated to wait for the next image to arrive, but instead, object detection can be immediately started on said last received image.

Figure 4B:
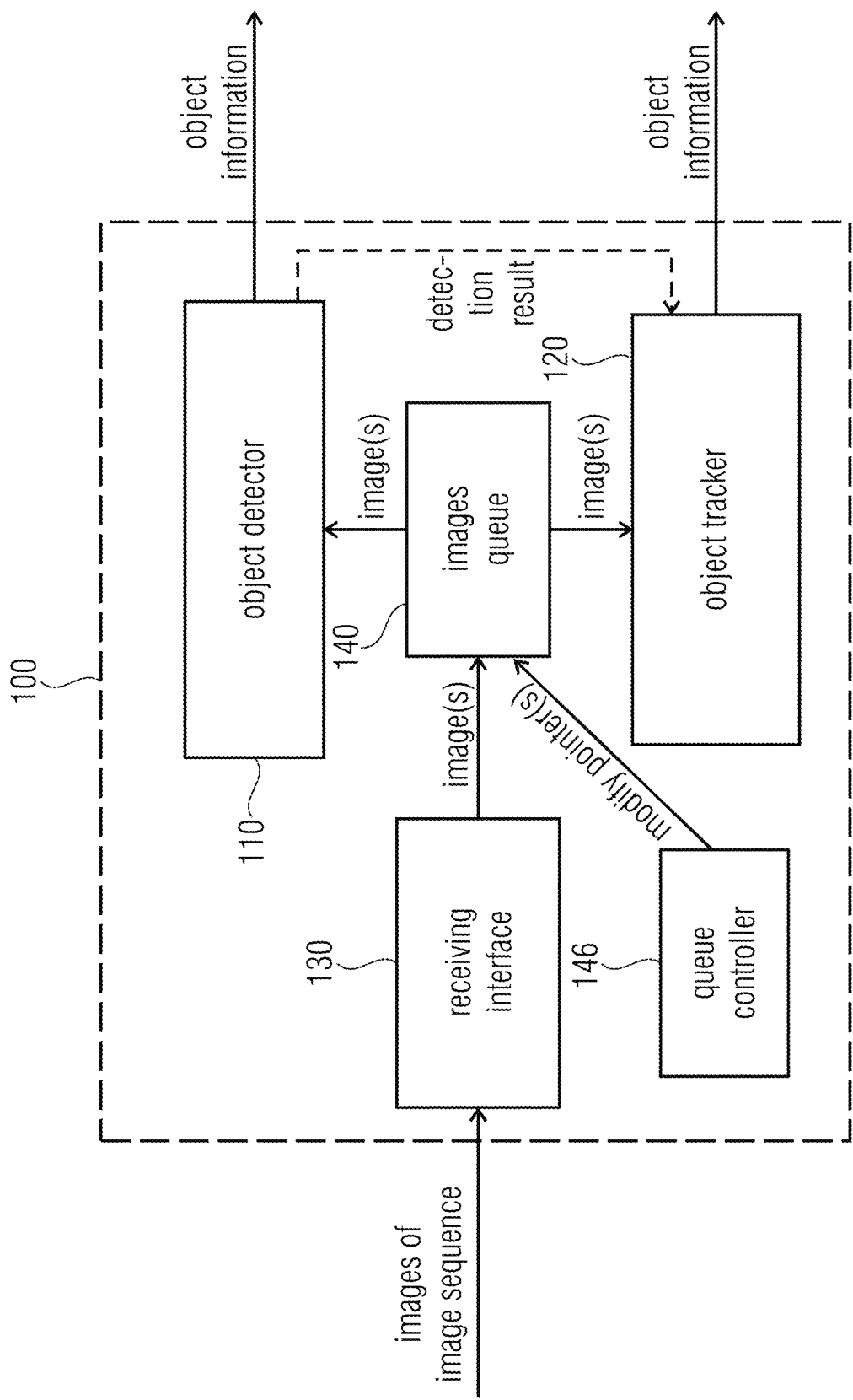
FIG. 4b illustrates an apparatus for providing object information based on an image sequence comprising a plurality of images according to another embodiment.

FIG. 4b illustrates another embodiment, wherein the apparatus 100 further comprises one or more first pointers indicating a detection queue portion of the image queue 140. Moreover, the apparatus further comprises one or more second pointers indicating a tracking queue portion of the image queue 140. Moreover, the apparatus further comprises a queue controller 146.

The queue controller 146 is configured to modify, depending on whether object detection on one of the images of the image sequence conducted by the object detector 110 is completed, at least one pointer of the one or more first pointers and the one or more second pointers, such that one or more images being located within the detection queue portion of the image queue 140 before modification of said at least one pointer, are located, after the modification of said at least one pointer, within the tracking queue portion of the image queue 140. The object tracker 120 is configured to conduct object tracking on one of the images being located in the tracking queue portion of the image queue 140, depending on whether images are stored in the tracking queue portion of the image queue 140.

Figure 6A:
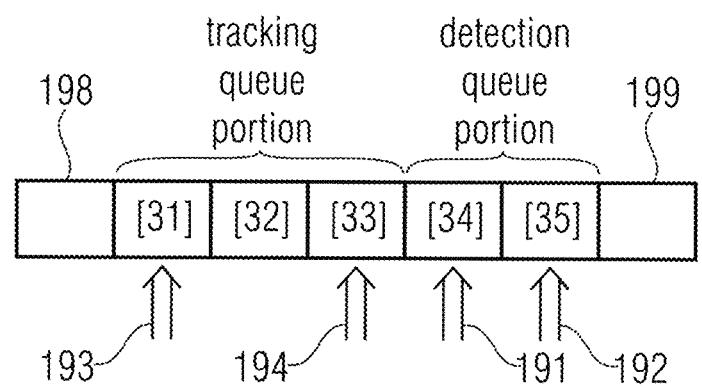
FIGS. 6a and 6b illustrate an image queue according to an embodiment.
Figure 6B:
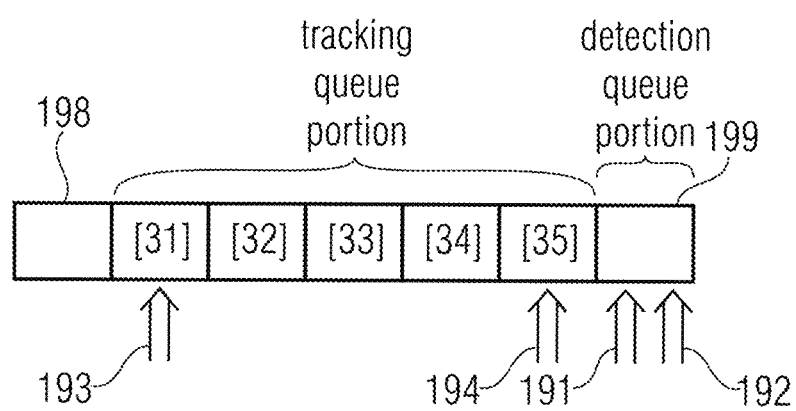

FIGS. 6*a* and 6*b* illustrate an image queue 140 of the embodiment of FIG. 4*b*. In FIGS. 6*a* and 6*b*, the image queue comprises the images [31], [32], [33], [34] and [35]. Two positions 198, 199 of the image queue are empty.

A first one (191) of the first pointers indicates the beginning of the detection queue portion of the image queue. In FIG. 6*a*, the first one (191) of the first pointers points to the position of the image [34]. A second one (192) of the first pointers indicates the end of the detection queue portion of the image queue. In FIG. 6*a*, the second one (192) of the first pointers points to the position of the image [35]. Thus, in FIG. 6*a*, the detection queue portion of the image queue comprises the images [34] and [35].

A first one (193) of the second pointers indicates the beginning of the tracking queue portion of the image queue. In FIG. 6*a*, the first one (193) of the second pointers points to the position of the image [31]. A second one (194) of the second pointers indicates the end of the tracking queue portion of the image queue. In FIG. 6*a*, the second one (194) of the first pointers points to the position of the image [33]. Thus, in FIG. 6*a*, the tracking queue portion of the image queue comprises the images [31], [32] and [33].

The queue controller 146 of FIG. 4*b* may move some or all of the pointers 191, 192, 193, 194 upon completion of object detection of an image of the image queue. FIG. 6*b* illustrates the pointers after being moved.

In FIG. 6*b* the pointers 191 and 192 now point to the empty position 199 of the image queue and thus indicate that the detection queue portion of the image queue is empty. The pointer 193 still points to the position of image [31] and the pointer 194 now points to the position of image [35]. By this, the pointers 193 and 194 indicate that the tracking queue portion of the image queue comprises the images [31], [32], [33], [34] and [35].

The above-described pointers 191, 192, 193 and 194 may be implemented as memory pointers pointing to a portion of a memory. E.g., the pointers 192 and 193 may be replaced by a single pointer indicating the end of the detection queue portion and the beginning of the tracking queue portion.

In the following, particular embodiments are described.

According to an embodiment, as illustrated by FIG. 5, the apparatus 100 comprises a detection queue 141 as illustrated assigned to an object detector 110 and a tracking queue 142 assigned to an object tracker 120.

In some embodiments, the object detector 110 may, for example, process the most recent image in the detection queue 141 or waits for a new image if the detection queue 141 is empty. During object detection, new images might already become available and are enqueued in the detection queue 141. When the object detector 110 finishes, it assigns the detection result to the image and all images of the detection queue 141 are moved to the tracking queue 142. Alternatively, the most recent image might remain in the detection queue 141 to be processed by the object detector 110 next.

According to some embodiments, the object tracker 120 waits if the tracking queue 142 is empty or takes out the first image of the tracking queue 142 along with the related detection result, if available. If a detection result is available, the object tracker 120 updates the tracking state of already detected and tracked objects or adds new objects to the tracking state, if they were not previously detected or tracked. Moreover the object tracker 120 tracks all objects of the tracking state in the image that were not detected in the current image and updates the tracking state. Objects can also be removed from the tracking state, if the object tracker 120 is not able to track an object, for example caused by occlusion or object appearance changes. The detection and tracking result may be assigned to the image and becomes available after the object tracker 120 finished.

In some embodiments, the object tracker 120 is implemented as described in T. Wittenberg, C. Munzenmayer, C. Kueblbeck, and A. Ernst, "Verfahren und System zum Erkennen eines Objektes, und Verfahren und System zum Erzeugen einer Markierung in einer Bildschirmdarstellung mittels eines beruhrungslos gestikgesteuerten Bildschirmzeigers," Schutzrecht, November 2010; DE 10 2009 017 772 A1. In other embodiments, however, the object tracker 120 is based on any other object tracking concept, for example, based on template matching.

Every new image provided by an image source may be enqueued in the detection queue 141, and each detection result and tracking result becomes available as the image content after the object tracker 120 finishes. New images provided by the image source might also be skipped, if a maximum queue length is defined and the number of images buffered in both queues 141, 142 reaches this limit. This maximum queue length also limits the maximum latency that could be introduced by the queues 141, 142. The detection and tracking queues 141, 142 could also be implemented as a single queue instance 140 (an image queue) with markers (pointers or iterators) that define the end and start of the detection queue (portion) and tracking queue (portion), respectively.

According to an embodiment, the object detector is configured to conduct object detection without skipping any portion of an image on which object detection is conducted. In such a particular embodiment, object detection is conducted on the complete image and no portions of the image exist where object detection is not conducted.

Figure 2A:
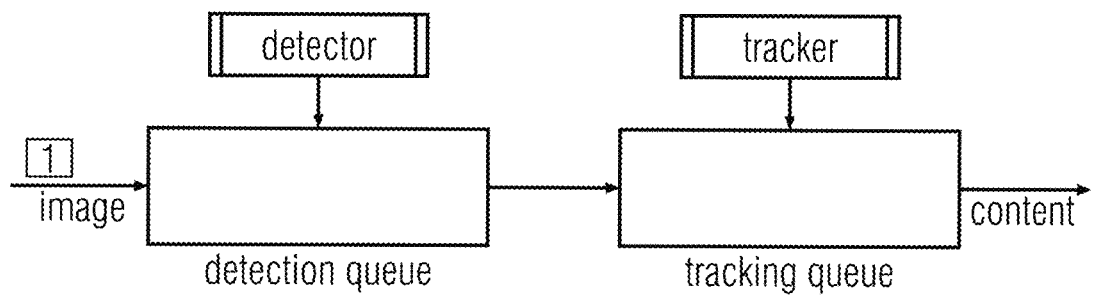
FIGS. 2a-2h, 2j-2n, and 2p-2v illustrate detection and tracking concepts according to embodiments.
Figure 2B:
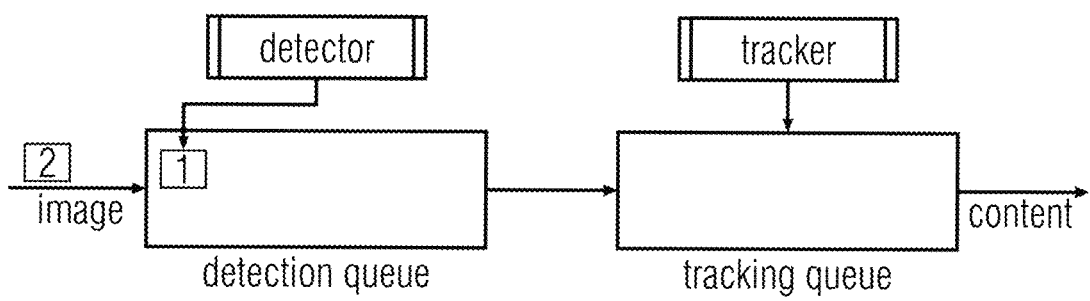
Figure 2C:
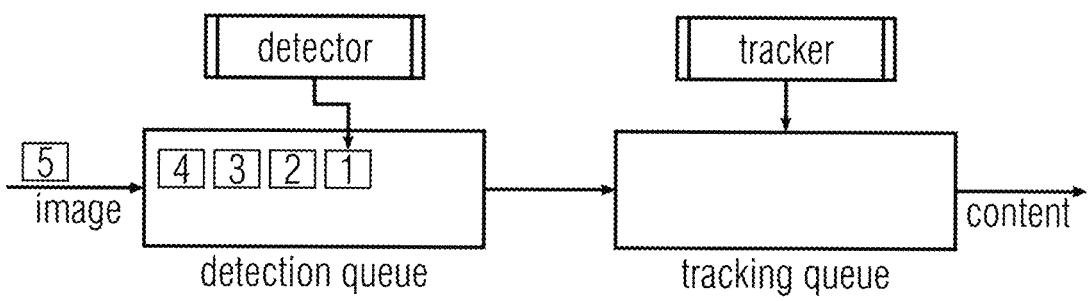
Figure 2D:
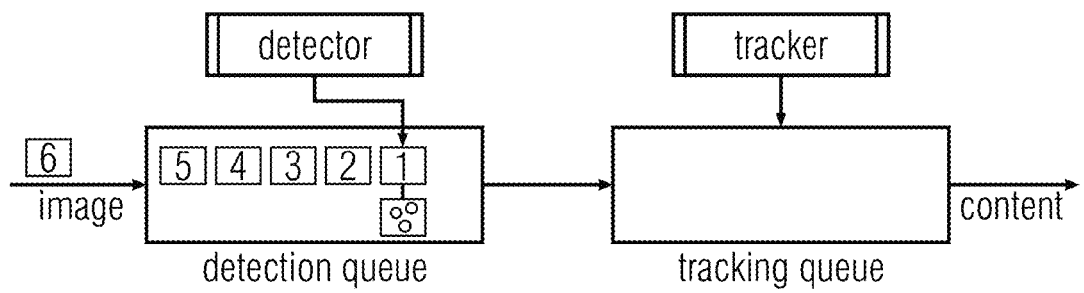
Figure 2E:
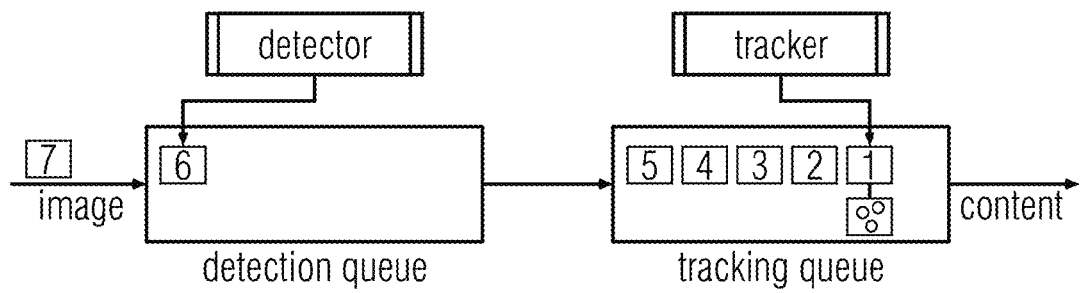
Figure 2F:
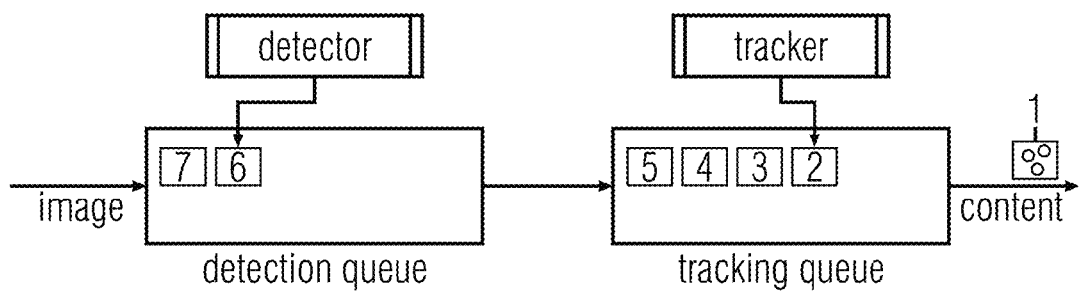
Figure 2G:
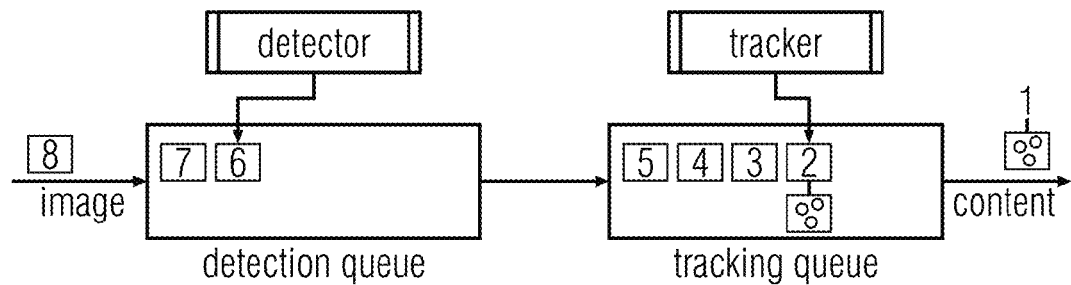
Figure 2H:
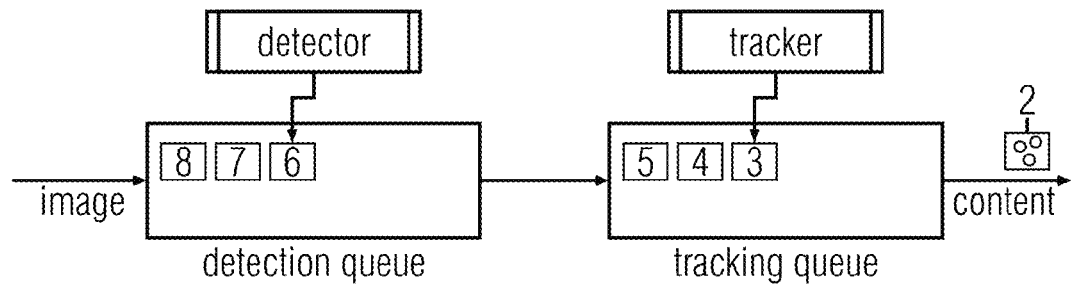
Figure 2J:
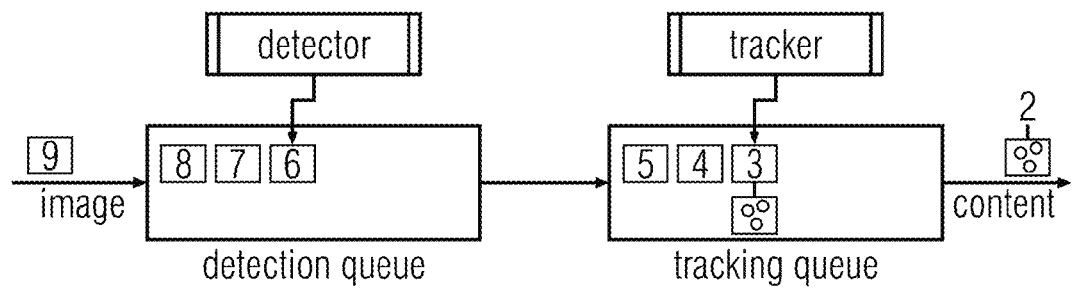
Figure 2K:
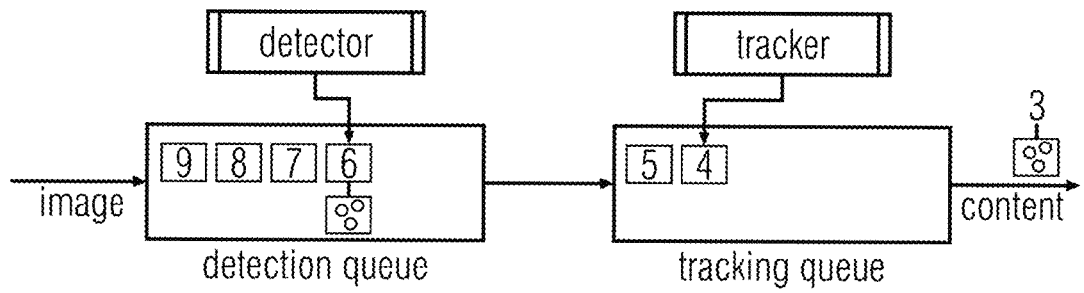
Figure 2L:
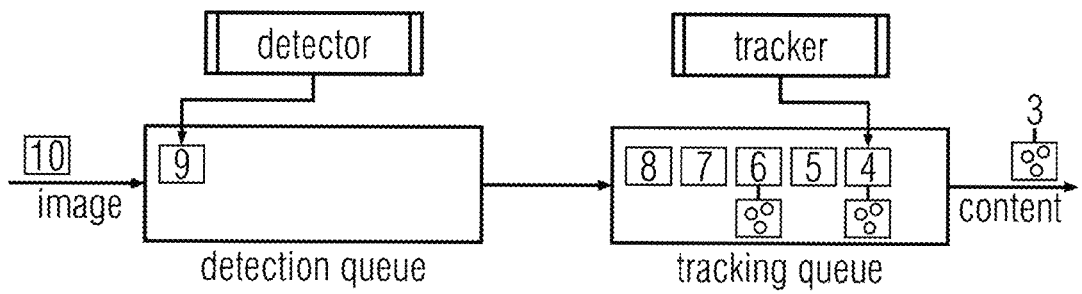
Figure 2M:
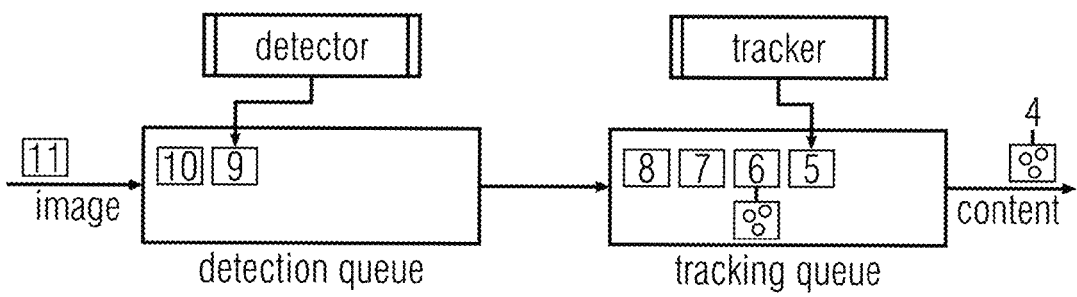
Figure 2N:
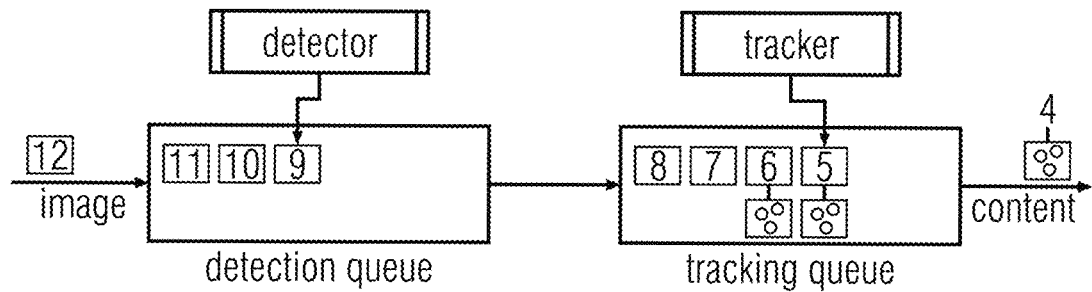
Figure 2P:
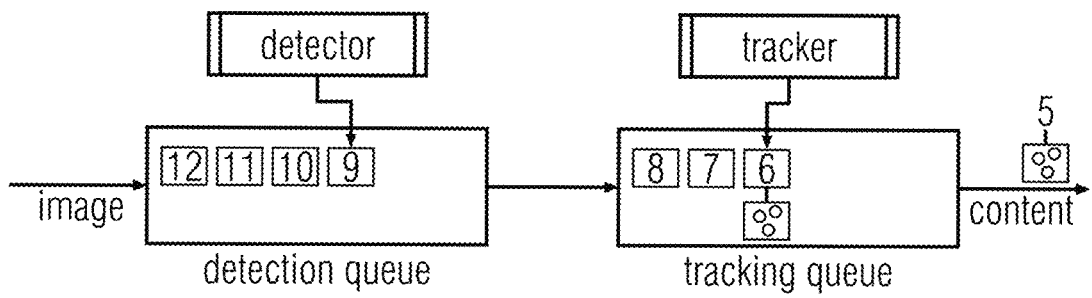
Figure 2Q:
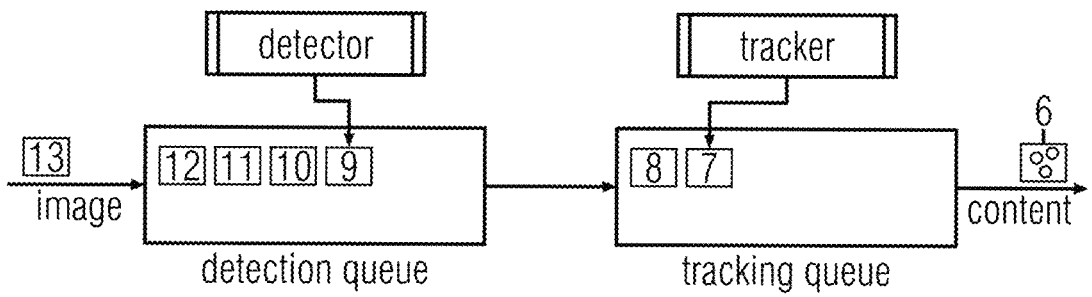
Figure 2R:
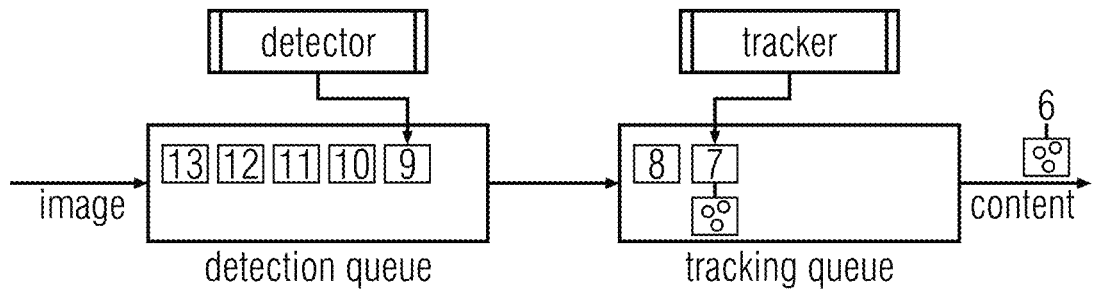
Figure 2S:
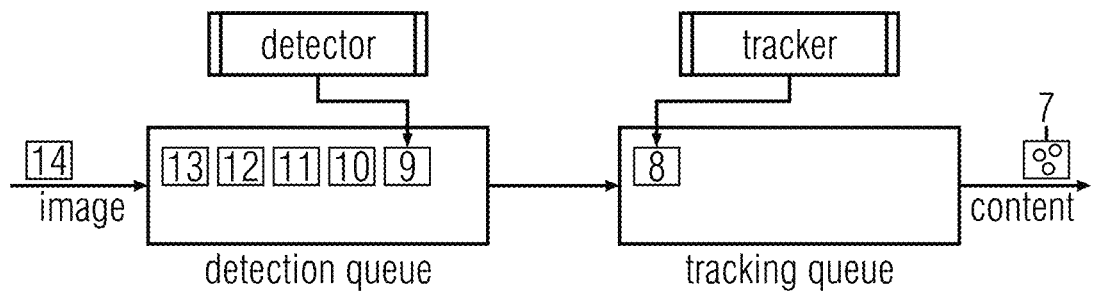
Figure 2T:
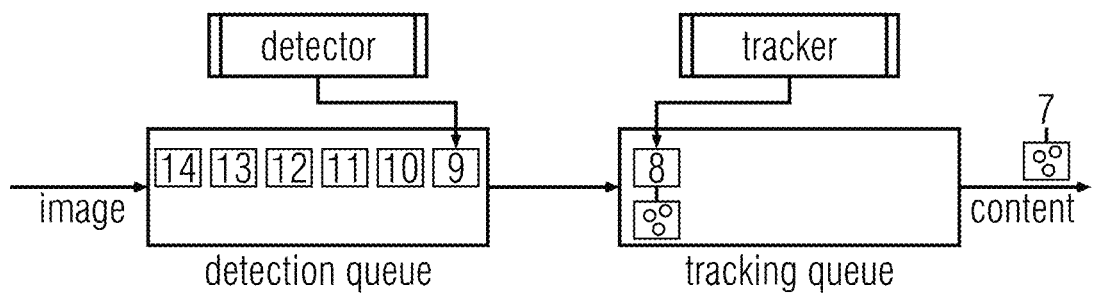
Figure 2U:
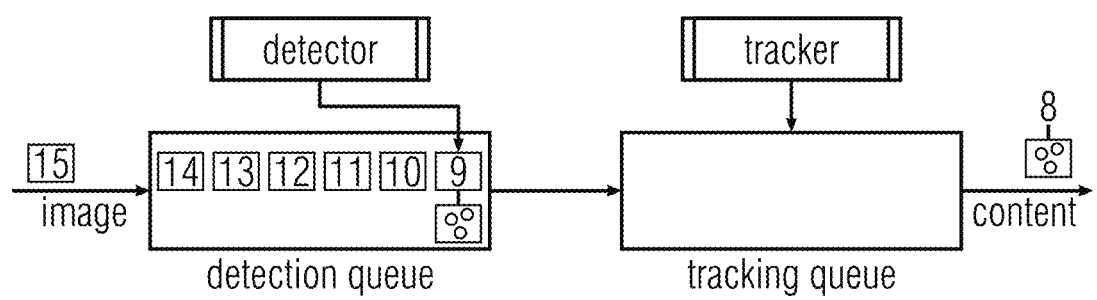
Figure 2V:
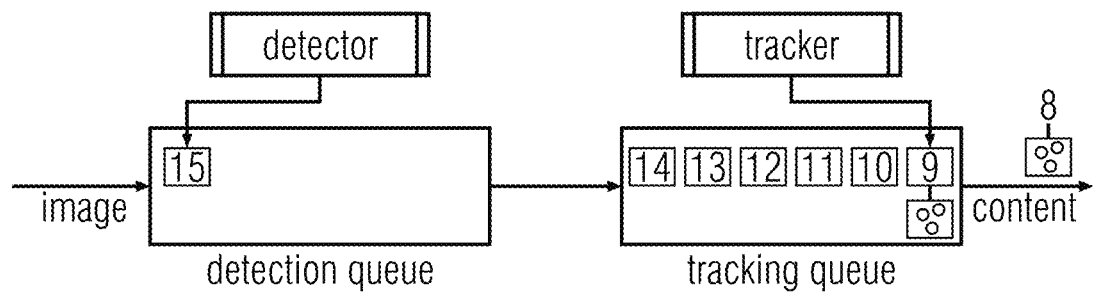

FIGS. 2*a*-2*v* illustrate detection and tracking concepts according to embodiments. In particular, FIGS. 2*a*-2*v* illustrate the queues and the object detector and object tracker and show a possible succession of states when processing an image sequence. More particularly, FIG. 2*a*-2*v* depict possible successions of states passed during the 15 initial frames of an image sequence. However, they do not depict equidistant points in time.

In FIG. 2*a*, the image source provides image 1 for enqueueing. The detector and the tracker wait for an image in the detection queue and tracking queue, respectively.

In FIG. 2*b*, the first image was enqueued and the detector processes it. The tracker still waits for an image. The image source provides image 2 for enqueueing.

FIG. 2*c* illustrates the situation some images later, where the detection queue buffers four images and the image source provides image 5 for enqueueing. The detector still processes image 1.

In FIG. 2*d*, image 5 was enqueued and the image source provides image 6 for enqueueing. The detector finished the object detection in image 1 and assigned the detected objects to image 1.

In FIG. 2*e*, images 1 to 5 were moved from the detection queue to the tracking queue, while skipping object detection in image 2 to image 5. The detector processes the most recent image 6. The tracker processes image 1 and internally stores the detected objects for tracking in subsequent images. The image source provides image 7 for enqueueing.

In FIG. 2f, image 7 was enqueued. The detector still processes image 6. The tracker finished processing image 1 and provided the objects as the image content to the output.

In FIG. 2g, the image source provided image 8 for enqueueing. The detector still processes image 6. The tracker tracked the internally stored objects in image 2 and assigned the tracked objects to the image.

In FIG. 2h, image 8 was enqueued. The detector still processes image 6. The tracker provided the tracked objects of image 2 to the output and processes image 3.

In FIG. 2j, the image source provided image 9 for enqueueing. The detector still processes image 6. The tracker finished object tracking in image 3 and assigns the tracked objects to image 3.

In FIG. 2k, image 9 was enqueued. The detector finished the detection process in image 6 and assigned the detected objects to image 6. The tracker provided the tracked objects of image 3 to the output and processes Image 4.

In FIG. 2l, all but one image was moved from the detection queue to the tracking queue, skipping object detection in images 7 and 8. The detector processes image 9. The tracker finished tracking in image 4 and assigned the tracked objects to image 4. The image source provided image 10 for enqueueing.

In FIG. 2m, image 10 was enqueued and the image source provided image 11 for enqueueing. The detector still processes image 9. The tracker provided the tracked object of image 4 to the output and processes Image 5.

In FIG. 2n, image 11 was enqueued and the image source provides image 12 for enqueueing. The detector still processes image 9. The tracker finished processing image 5 and assigned the tracked objects to image 5.

In FIG. 2p, image 12 was enqueued. The detector still processes image 9. The tracker provided the objects of image 5 to the output and continues with image 6 that was already processed by the detector. The tracker matches and updates the internally stored objects with the detected objects, adds previously undetected objects to the internal memory and tries to track the objects that were lost by the detector.

In FIG. 2q, the image source provided image 13 for enqueueing. The detector still processes image 9. The tracker finished processing image 6, provided the detected and tracked objects of image 6 to the output and continues with image 7.

In FIG. 2r, image 13 was enqueued. The detector still processes image 9. The tracker finished processing image 7 and assigned the tracked objects to the image.

In FIG. 2s, the image source provided image 14. The detector still processes image 9. The tracker provided the tracked objects of image 7 to the output and processes image 8.

In FIG. 2t, image 14 was enqueued. The detector still processes image 9. The tracker finished tracking objects in image 8 and assigned the result to image 8.

In FIG. 2u, the image source provided image 15 for enqueueing. The detector finished object detection in image 9 and assigned the detected objects to image 9. The tracker provided the result of image 8 to the output and waits until new images are available in the tracking queue.

In FIG. 2v, images 9 to 14 were moved from the detection queue to the tracking queue. Image 15 was enqueued and is currently processed by the detector. The tracker compares the detected objects of image 9 with the internally stored objects, updates matching objects, adds newly detected objects and tracks objects that were lost by the detector. This state is similar to the situation shown in FIG. 2e, again.

Inter alia, benefits of at least some of the provided embodiments are:

Detection and tracking of many objects in high resolution image sequences with high frame rates even on slower hardware, for example, on embedded systems or mobile devices.

Efficient parallelization of the detection and tracking task and usage of multiple cores.

Adaptation of the number of processed images (key frames) automatically to the available or assigned resources by the object detector.

Resource-friendly use of high-performance hardware.

Fields of application may, for example, be:

Resource-friendly and fast detection and tracking of objects for mobile devices.

Automatic view selection or camera control for keeping relevant regions of a scene inside the camera image or cropping the image to regions-of-interest.

Object detection and tracking in high-resolution or high-speed image sequences.

Video-based object or person counter, in particular in frequented areas.

In the following further object detection concepts are presented that may be employed in combination with the above-described embodiments.

Figure 7C:
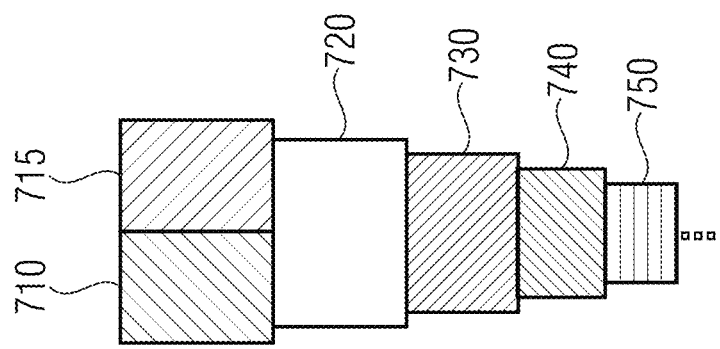
FIGS. 7a-7c illustrate object detection concepts.
Figure 7B:
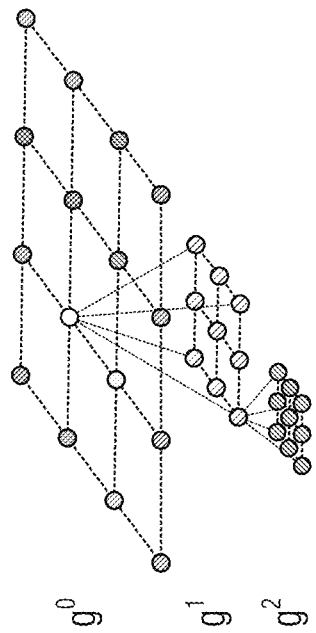
Figure 7A:
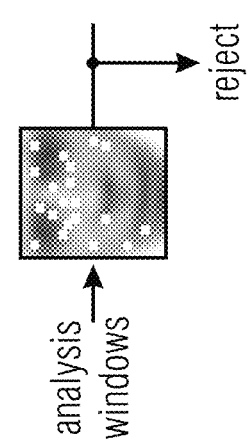

FIG. 7a illustrates a concept for object detection. Object detection is conducted in a plurality of stages. Early stages use only a few simple patterns for candidate search. The areas that are excluded from further stages of the object detection (e.g., because analysis showed that the objects are definitely not in those areas) is often more than 90% of the total image. Later stages are conducted with a lot of, more complex, patterns for verification. In other words, the remaining areas are analyzed in more detail. Threshold values may be employed.

FIG. 7b illustrates a hierarchical search with a detector. At first a coarse lattice is searched, e.g., honeycomb lattice. If a search result is greater than a threshold value, a finer local search is conducted in a smaller lattice.

FIG. 7c depicts an image illustrating concepts, e.g., applied by a pyramid scanner. A search is conducted employing different scales (image pyramid). In other words, different sizes of one or more images are searched, e.g., to detect objects of different sizes. In video mode, for optimization, a sliced pyramid scanner may be employed.

For example, regarding FIG. 7c, five image sizes are illustrated. The biggest image size (710, 715) is further subdivided into a left portion (710) and into a right portion (715). The following strategy may be applied on incoming image frames of an image frame sequence:

Regarding image frames 1, 6, 11, 16, 21, . . . rescale each image frame to the biggest size and search the left image (710), Regarding image frames 2, 7, 12, 17, 22, . . . rescale each image frame to the biggest size and search the right image (715), Regarding image frames 3, 8, 13, 18, 23, . . . rescale each image frame to a smaller image size indicated by reference sign 720 and search the whole image, Regarding image frames 4, 9, 14, 19, 24, . . . rescale each image frame to an even smaller image size indicated by reference sign 730 and search the whole image, then they rescale the image to a still smaller size indicated by reference sign 740 and search again the whole image, Regarding image frames 5, 10, 15, 20, 25, . . . rescale each image frame to an even smaller image size indicated by reference sign 750 and search the whole image, repeat recalling and searching to smaller size.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for providing object information based on an image sequence comprising a plurality of images, wherein the apparatus comprises:
    an object detector for conducting object detection on three or more images of the plurality of images of the image sequence to acquire a result of the object detection as the object information, wherein each image of the image sequence on which object detection is conducted, is an object-detected image of the image sequence, and wherein each image of the image sequence on which object detection is not conducted, is not an object-detected image of the image sequence, and
    an object tracker for conducting object tracking on one or more images of the image sequence to acquire a result of the object tracking as the object information,
    wherein the object detector is adapted to conduct object detection and the object tracker is adapted to conduct object tracking such that an object detection distance is different for at least two pairs of two object-detected images of the image sequence, wherein the object detection distance is defined for each pair of two object-detected images of the image sequence, for which at least one image exists between said two object-detected images within the image sequence, and for which no object-detected image exists between said two object-detected images within the image sequence, as the number of images between said two object-detected images within the image sequence, which are not object-detected images,
    wherein the apparatus furthermore comprises a receiving interface, a detection queue, a tracking queue and a queue controller,
    wherein the receiving interface is configured to receive the plurality of images of the image sequence, and wherein the receiving interface is configured to store at least some of the images of the image sequence within the detection queue,
    wherein the queue controller is configured to move one or more images, being stored in the detection queue, from the detection queue to the tracking queue depending on whether object detection on one of the images of the image sequence conducted by the object detector is completed, and
    wherein the object tracker is configured to conduct object tracking on one of the images being stored in the tracking queue, depending on whether images are stored in the tracking queue.

2. An apparatus according to claim 1,
    wherein the object detector is configured to conduct object detection on a first one of the plurality of images of the image sequence, and wherein the object detector is configured to start conducting object detection on a second one of the images of the image sequence depending on when the conducting of the object detection on the first one of the plurality of images is completed.

3. An apparatus according to claim 1, wherein the object detector is configured to conduct object detection on one of the plurality of images of the image sequence in parallel to the object tracker conducting object tracking on another one of the plurality of images of the image sequence.

4. An apparatus according to claim 3, wherein the object detector is configured to employ at least two processes or at least two threads to conduct object detection on said one of the plurality of images of the image sequence in parallel.

5. An apparatus according to claim 3, wherein the object tracker is configured to employ at least two processes or at least two threads to conduct object tracking on said another one of the plurality of images of the image sequence in parallel.

6. An apparatus according to claim 1,
wherein the object detector is configured to select as a selected image, when two or more images of the image sequence are stored in the image queue, an image of the two or more images of the image sequence being stored in the image queue, which has most recently been received by the receiving interface among all images of the two or more images of the image sequence being stored in the image queue, and
wherein the object detector is configured to conduct object detection on the selected image.

7. An apparatus according to claim 1, wherein the receiving interface is configured to not store an image of the image sequence received by the receiving interface within the image queue, when the number of images that are stored in the image queue is equal to a maximum number.

8. An apparatus according to claim 1,
wherein the object detector is configured to acquire a detection result by conducting object detection on one of the plurality of images of the image sequence,
wherein the object tracker is configured to receive the detection result,
wherein the object tracker is configured to retrieve at least one of the images of the image sequence from the image queue when the object tracker has received the detection result, and
wherein the object tracker is configured to conduct object tracking on said at least one of the images retrieved from the image queue based on the detection result.

9. An apparatus according to claim 1, wherein the queue controller is configured to move all images being stored in the detection queue from the detection queue to the tracking queue, depending on whether the object detection on said one of the images of the image sequence conducted by the object detector is completed.

10. An apparatus according to claim 1, wherein the queue controller is configured to move all but one image being stored in the detection queue from the detection queue to the tracking queue, depending on whether the object detection on said one of the images of the image sequence conducted by the object detector is completed, wherein said one image being stored in the detection queue which is not moved from the detection queue to the tracking queue is that image which is last received by the receiving interface among all images being stored in the detection queue.

11. An apparatus according to claim 1, wherein the object detector is configured to conduct object detection without skipping any portion of an image on which object detection is conducted.

12. An apparatus according to claim 1,
wherein the object detector is configured to conduct object detection on the plurality of images of the image sequence by conducting face detection, and
wherein the object tracker is configured to conduct object tracking on the one or more images of the image sequence by conducting face tracking.

13. A method for providing object information based on an image sequence comprising a plurality of images, wherein the method comprises:
conducting object detection on three or more images of the plurality of images of the image sequence to acquire a result of the object detection as the object information, wherein each image of the image sequence on which object detection is conducted, is an object-detected image of the image sequence, and wherein each image of the image sequence on which object detection is not conducted, is not an object-detected image of the image sequence, and
conducting object tracking on one or more images of the image sequence to acquire a result of the object tracking as the object information,
wherein object detection and object tracking is conducted such that an object detection distance is different for at least two pairs of two object-detected images of the image sequence, wherein the object detection distance is defined for each pair of two object-detected images of the image sequence, for which at least one image exists between said two object-detected images within the image sequence, and for which no object-detected image exists between said two object-detected images within the image sequence, as the number of images between said two object-detected images within the image sequence, which are not object-detected images,
wherein the method further comprises:
receiving the plurality of images of the image sequence,
storing at least some of the images of the image sequence within a detection queue,
moving one or more images, being stored in the detection queue, from the detection queue to a tracking queue depending on whether object detection on one of the images of the image sequence conducted by the object detector is completed, and
conducting object tracking on one of the images being stored in the tracking queue, depending on whether images are stored in the tracking queue.

14. Non-transitory digital storage medium having computer-readable code stored thereon to perform the method of claim 13 when being executed on a computer or signal processor.

* * * * *